(12) United States Patent
Torii

(10) Patent No.: US 11,821,160 B2
(45) Date of Patent: Nov. 21, 2023

(54) FRONT LOADER AND WORK CAR

(71) Applicant: Kubota Corporation, Osaka (JP)

(72) Inventor: Shin Torii, Osaka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/456,398

(22) Filed: Nov. 24, 2021

(65) Prior Publication Data
US 2022/0290399 A1 Sep. 15, 2022

(30) Foreign Application Priority Data
Mar. 10, 2021 (JP) .................. 2021-038227

(51) Int. Cl.
*E02F 3/38* (2006.01)
*B62D 49/02* (2006.01)
*E02F 3/34* (2006.01)

(52) U.S. Cl.
CPC .............. *E02F 3/382* (2013.01); *B62D 49/02* (2013.01); *E02F 3/34* (2013.01)

(58) Field of Classification Search
CPC ..... E02F 3/38; E02F 3/382; E02F 3/96; E02F 3/627

USPC ......................................................... 414/686
See application file for complete search history.

(56) References Cited

U.S. PATENT DOCUMENTS

| 8,684,656 B2 * | 4/2014 | Hilsden | E02F 3/3695 |
| | | | 414/920 |
| 2002/0157286 A1 * | 10/2002 | Fatemi | E02F 3/3663 |
| | | | 37/403 |

FOREIGN PATENT DOCUMENTS

JP 2011-126325 A 6/2011

\* cited by examiner

*Primary Examiner* — Ronald P Jarrett
(74) *Attorney, Agent, or Firm* — Osha Bergman Watanabe & Burton LLP

(57) ABSTRACT

A front loader is attached to a car body and includes: a boom; a mainframe fixed to the car body; and a subframe that is detachably attached to the mainframe and supports the boom. The subframe includes: a first engaging portion that engages with the mainframe, and a second engaging portion that engages with the mainframe at a different position from the first engaging portion. Both the first engaging portion and the second engaging portion are formed in an attachment member that is integrally formed and that constitutes at least a portion of the subframe.

9 Claims, 19 Drawing Sheets

FRONT LOADER AND WORK CAR

BACKGROUND

Technical Field

The present invention relates to art of a front loader mounted to a work vehicle such as a tractor and of a work car.

Description of Related Art

Conventionally, art of a front loader mounted to a work vehicle such as a tractor is well known. This is, for example, as taught in patent literature 1.

Patent literature 1 teaches a tractor provided with a front loader for, for example, loading dirt and sand. This front loader is provided with a mainframe (lower bracket) that is installed to a car body via an installation plate or the like and a with subframe (upper bracket) that is detachable from the mainframe and supports a boom. The subframe is fixed to this mainframe by engaging the mainframe in a plurality of locations.

Such a front loader (subframe) is detached from the car body (mainframe) when it is not needed and mounted to the car body when it is needed. To enable reliable mounting of the subframe to the mainframe, a clearance between an engaging portion of the subframe and an engaging portion of the mainframe needs to be enlarged to a certain extent in order to absorb dimensional variation between a plurality of engaging portions. However, enlarging this clearance creates a risk of rattling arising in these engaging portions.

PATENT LITERATURE

[Patent Literature 1] JP 2011-126325 A

The present invention is made in view of circumstances such as above, and one or more embodiments provide a front loader and a work car that can reduce rattling arising in an engaging portion between a mainframe and a subframe while maintaining easy detachability from a car body.

SUMMARY

Next, embodiments of the present invention are described.

That is, in aspect 1, a front loader comprises: a boom; a mainframe installed to a car body; and a subframe that is detachable from the mainframe and supports the boom. The subframe is equipped with a first engaging portion formed to be able to engage the mainframe and a second engaging portion formed to be able to engage the mainframe in a position that differs from the first engaging portion, and both the first engaging portion and the second engaging portion are formed in an attachment member formed integrally so as to constitute at least a portion of the subframe.

In aspect 2, the second engaging portion is a subframe-side insertion hole into which a fixing pin for fixing the mainframe and the subframe is inserted.

In aspect 3, the front loader further comprises a guide portion that guides the subframe to a predetermined position where the second engaging portion can engage the mainframe in a state wherein the first engaging portion engages the mainframe when fixing the subframe and the mainframe.

In aspect 4, the guide portion is equipped with a convex portion that is disposed in the subframe and is formed so as to protrude in one direction and a concave portion that is disposed in the mainframe, is formed so as to be recessed in the same direction as the one direction, and can contact the convex portion.

In aspect 5, the attachment member has a pair of lateral-face portions disposed at an interval from each other and is formed so as to house at least a portion of the mainframe between the lateral-face portions, and the convex portion is formed so as to protrude in the one direction from each of the lateral-face portions.

In aspect 6, the guide portion is equipped with a subframe-side flat portion that is disposed in the subframe and is formed in a flat shape and a mainframe-side flat portion that is disposed in the mainframe, is formed in a flat shape, and can contact the subframe-side flat portion.

In aspect 7, the subframe is equipped with a pair of supporting plates that supports the boom, each of the supporting plates has a fitting portion formed to be able to fit the attachment member, and the attachment member is fixed to the supporting plates while being fitted to the fitting portion.

In aspect 8, the fitting portion is formed so as to penetrate each of the supporting plates.

In aspect 9, the fitting portion is formed by cutting out a portion of an end face of each of the supporting plates.

In aspect 10, the attachment member is molded by casting or forging.

In aspect 11, a work car comprises the aforementioned front loader.

Effects such as the following are exhibited in one or more embodiments of the present invention.

In aspect 1, rattling arising in the engaging portions between the mainframe and the subframe can be reduced while maintaining easy detachability from the car body.

In aspect 2, the mainframe and the subframe can be fixed by inserting the fixing pin. This enables easy mounting of the front loader to the car body.

In aspect 3, a workability when mounting the front loader to the car body can be further improved.

In aspect 4, the subframe can be guided to the predetermined position by a simple configuration.

In aspect 5, working of the subframe can be made easy.

In aspect 6, the subframe can be guided to the predetermined position by a simple configuration.

In aspect 7, the attachment member can be firmly fixed to the supporting plates of the subframe.

In aspect 8, the attachment member can be installed to the supporting plates by a simple configuration.

In aspect 9, the attachment member can be installed to the supporting plates by a simple configuration.

In aspect 10, cost reduction can be achieved in molding the attachment member.

In aspect 11, a workability when mounting the front loader to the car body can be improved.

BRIEF DESCRIPTION OF DRAWINGS

FIG. 2 is a side view illustrating the front loader installed to a machine body frame and the like.

DETAILED DESCRIPTION OF EMBODIMENTS

In the following description, directions indicated by arrow U, arrow D, arrow F, arrow B, arrow L, and arrow R in the diagrams are respectively defined as an upward direction, a downward direction, a frontward direction, a backward direction, a leftward direction, and a rightward direction.

Figure 1:
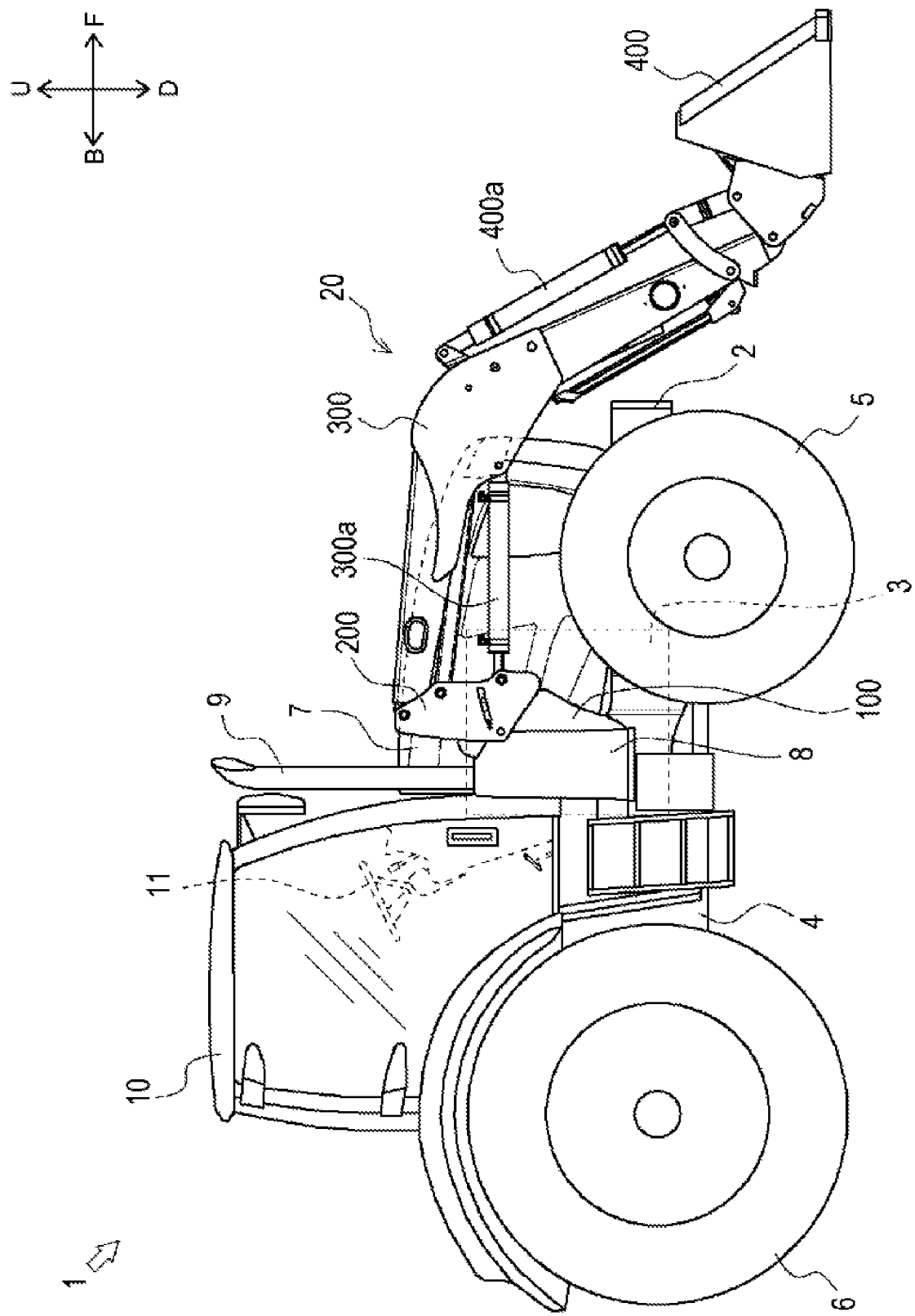
FIG. 1 is a side view illustrating an overall configuration of a tractor whereto a front loader according to a first embodiment of the present invention is mounted.
Figure 2:
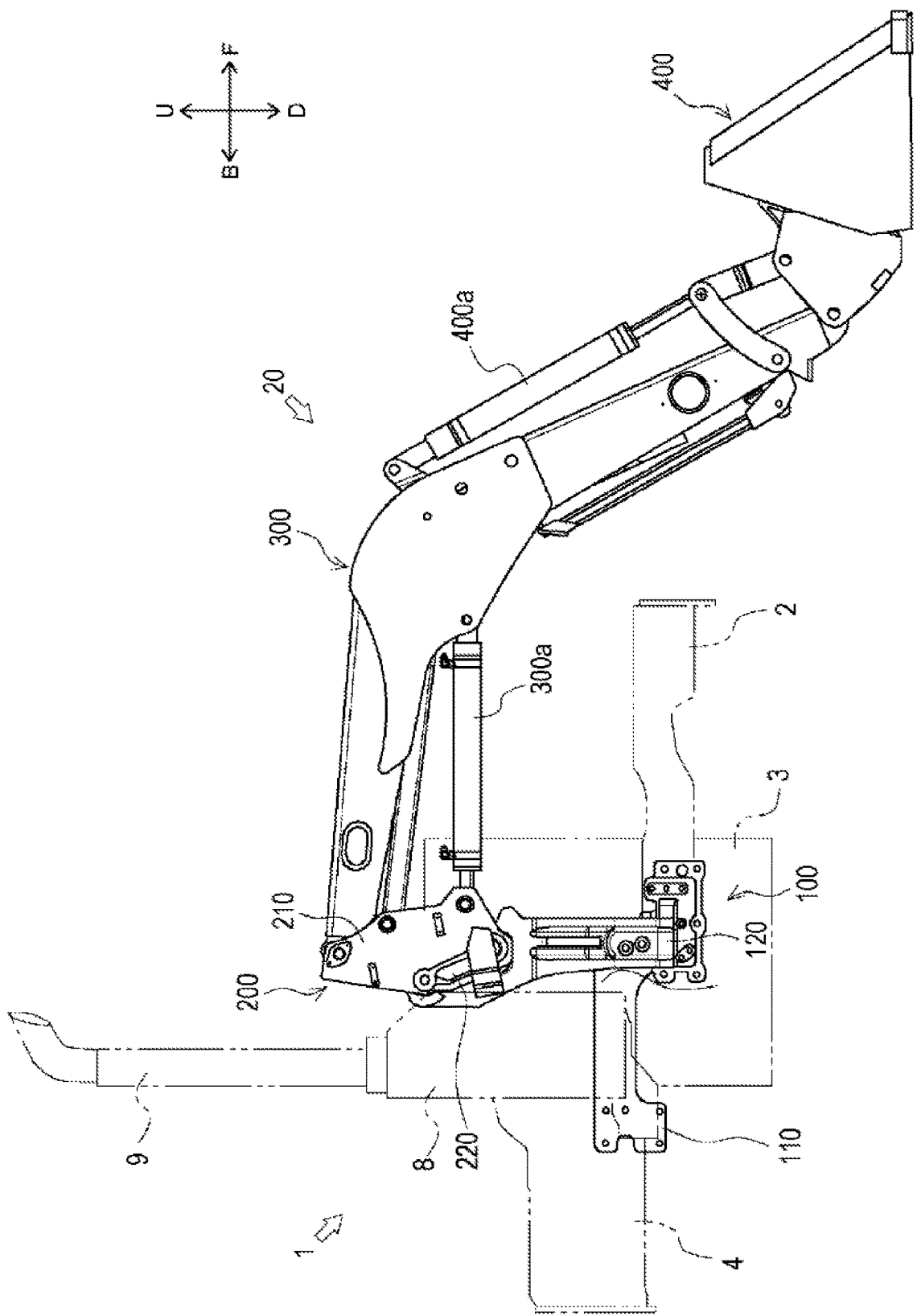

First, an overall configuration of a car body 1 of a tractor provided with a front loader 20 according to a first embodiment of the present invention is described using FIG. 1 and FIG. 2.

The tractor is mainly equipped with a machine body frame 2, an engine 3, a transmission case 4, a front wheel 5, a rear wheel 6, a hood 7, an SCR 8, a muffler 9, a cabin 10, a steering wheel 11, and the front loader 20.

The machine body frame 2 is a frame-shaped member formed by appropriately combining a plurality of plate materials. The machine body frame 2 is formed to have a substantially rectangular shape in a plan view. The machine body frame 2 is disposed in a front portion of the car body 1, its longitudinal direction being oriented in a front-back direction. The engine 3 is fixed to a back portion of the machine body frame 2. The transmission case 4 is fixed to a back portion of this engine 3. A front portion of the machine body frame 2 is supported by a pair of left and right front wheels 5 via a front axle mechanism (not illustrated). A back portion of the transmission case 4 is supported by a pair of left and right rear wheels 6 via a rear axle mechanism (not illustrated). The engine 3 is covered by the hood 7.

The SCR (selective catalytic reduction) 8, which is for purifying exhaust gas of the engine 3, is disposed on a rightward side of the hood 7. The muffler 9, which exhausts the exhaust gas of the engine 3, is disposed in an upper portion of the SCR 8. This SCR 8 and muffler 9 are fixed to the transmission case 4.

Power of the engine 3 is made transmittable to the front wheels 5 via the front axle mechanism and made transmittable to the rear wheels 6 via the rear axle mechanism upon shifting in a gearbox (not illustrated) housed in the transmission case 4. The front wheels 5 and the rear wheels 6 are rotationally driven by the power of the engine 3, enabling the tractor to travel.

The cabin 10 is disposed backward of the engine 3. Inside the cabin 10, a residing space boarded by a driver is formed. Inside this residing space, the steering wheel 11, which is for adjusting a steering angle of the front wheels 5; various operation tools (not illustrated); a seat for the driver to sit on (not illustrated); and the like are disposed.

The front loader 20 is mounted or attached to a front portion of the car body 1. The front loader 20 is mainly equipped with a pair of left and right mainframes 100, a pair of left and right subframes 200, a pair of left and right booms 300, and a bucket 400.

The mainframes 100 are respectively fixed to the left and right of the car body 1 (machine body frame 2 and transmission case 4). The subframes 200 are detachably supported by or attached to an upper portion of each mainframe 100. The booms 300 are rotatably supported by each subframe 200. The booms 300 are disposed so as to extend forward and downward from the upper portions of the mainframes 100. The bucket 400 is rotatably coupled to a front end portion of the booms 300. The booms 300 can be rotated relative to the subframes 200 by extending and contracting a boom cylinder 300a. The bucket 400 can be rotated relative to the booms 300 by extending and contracting a bucket cylinder 400a. In this manner, work of hauling dirt and sand and other work can be performed while rotating the booms 300 and the bucket 400 as appropriate.

Figure 3:
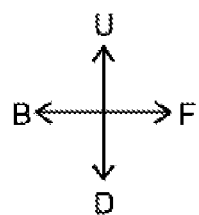
FIG. 3 is a side view illustrating a mainframe and a subframe.
Figure 3:
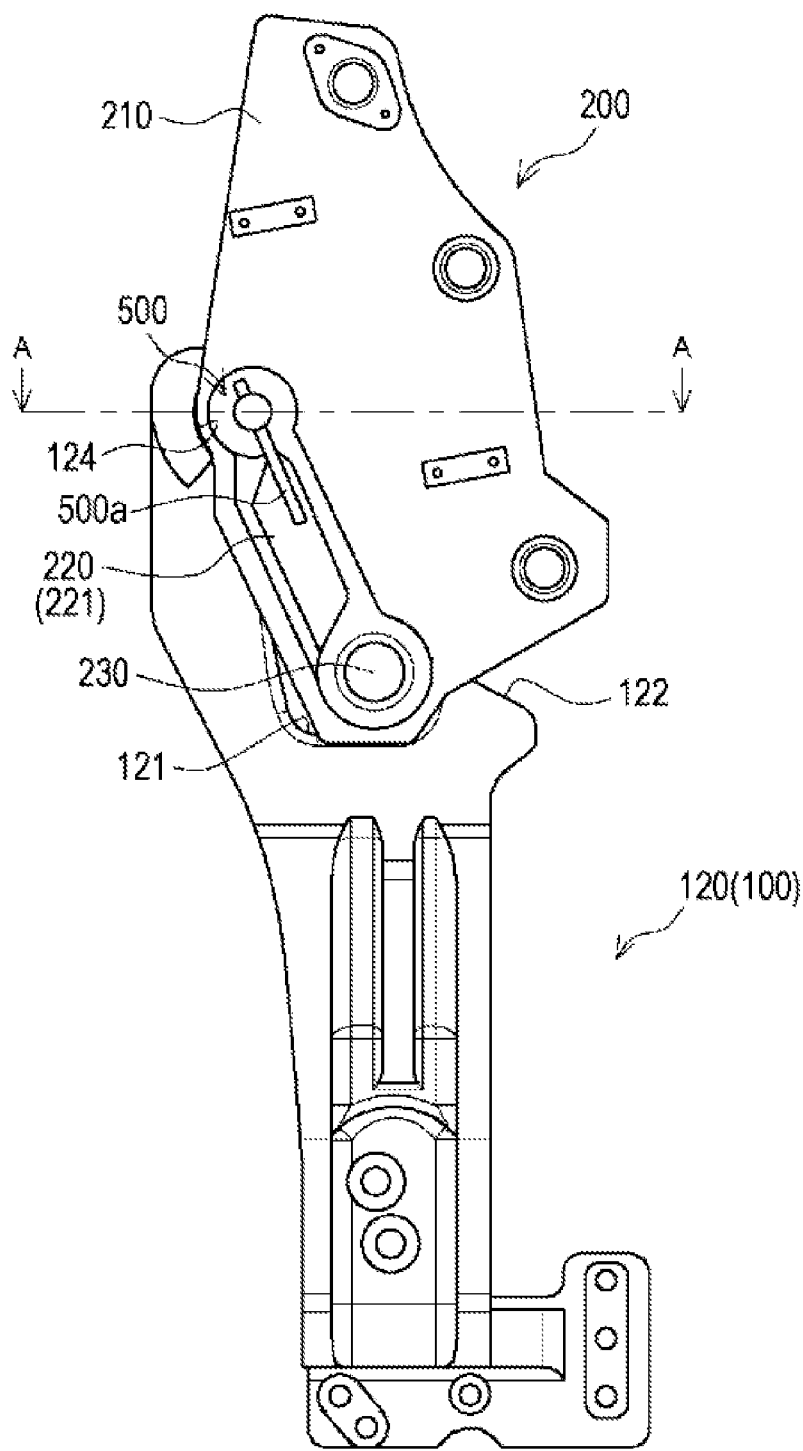
Figure 4:
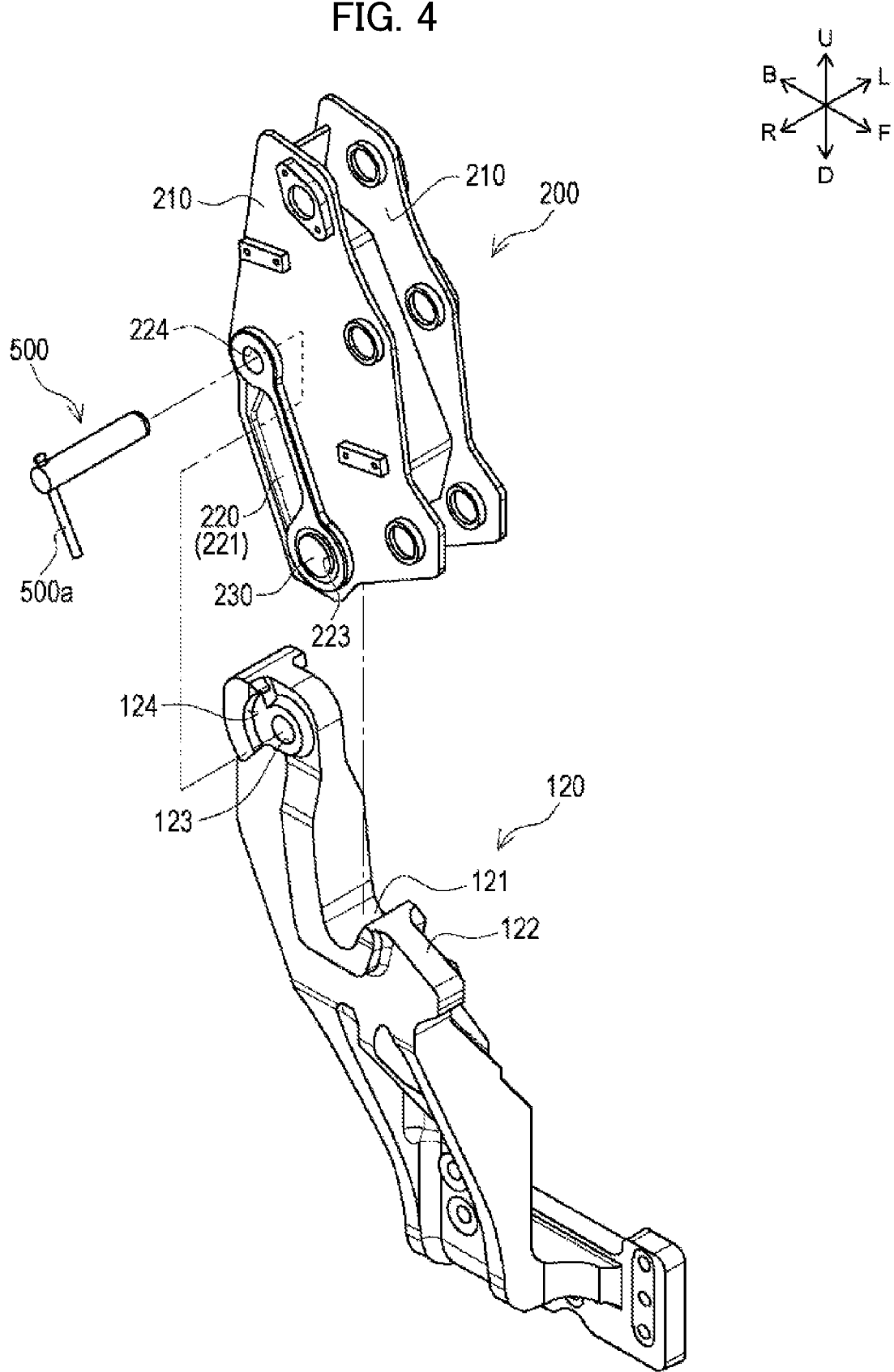
FIG. 4 is an exploded front perspective view illustrating the mainframe and the subframe.
Figure 5:
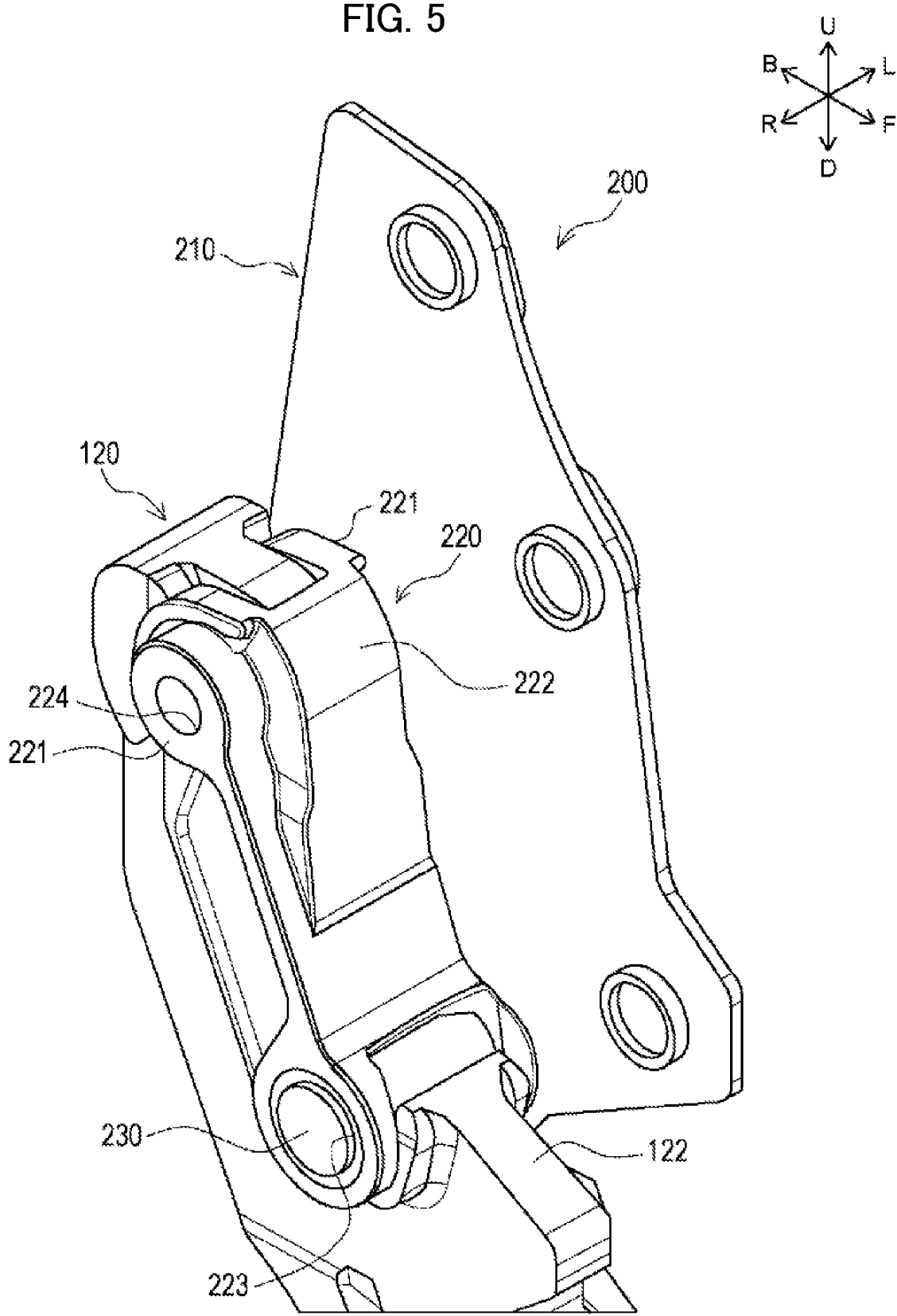
FIG. 5 is a front perspective view illustrating the mainframe and the subframe.
Figure 6:
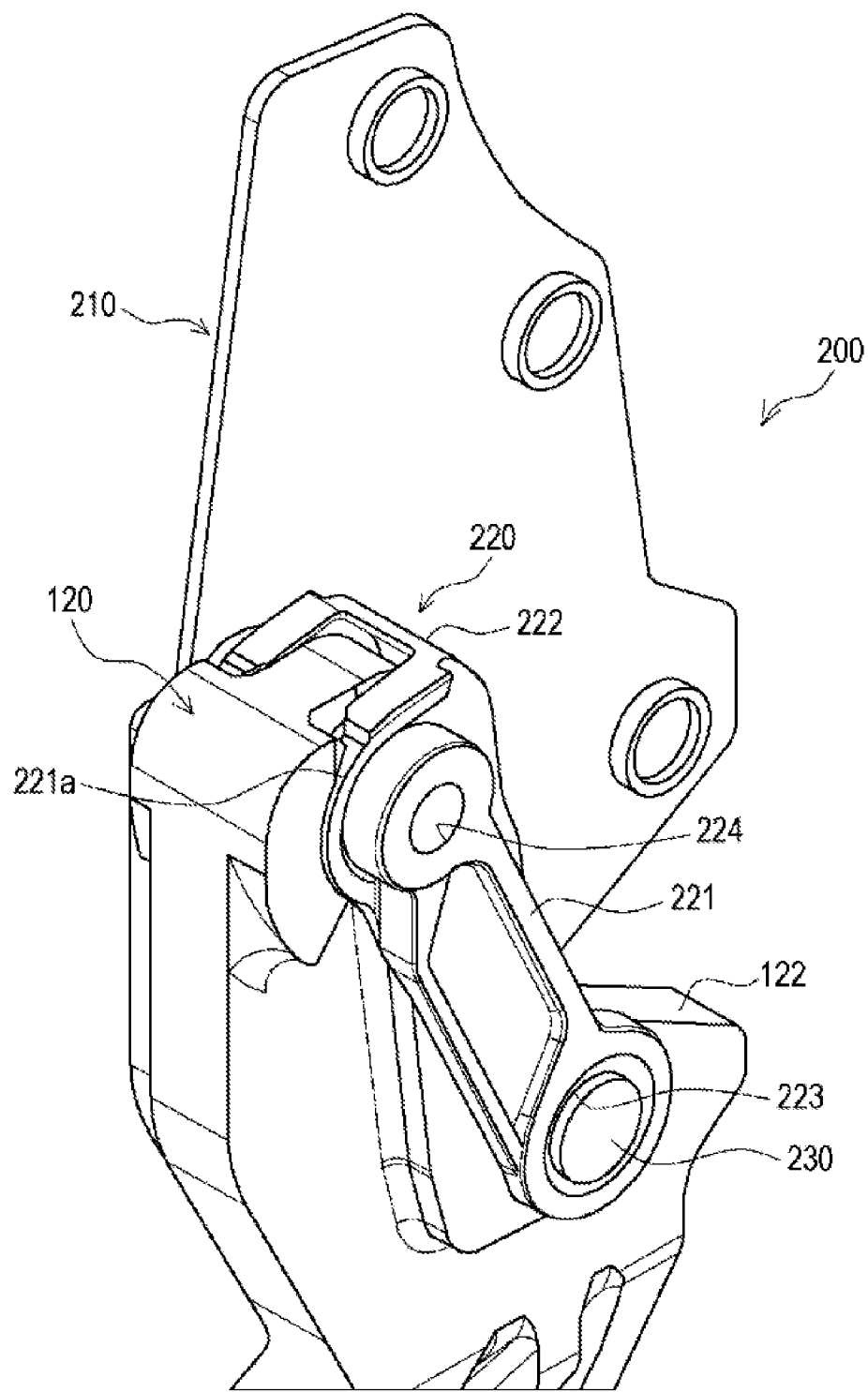
FIG. 6 is a back perspective view illustrating the mainframe and the subframe.
Figure 7:
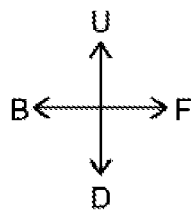
FIG. 7 is an enlarged side view illustrating the mainframe and the subframe.
Figure 7:
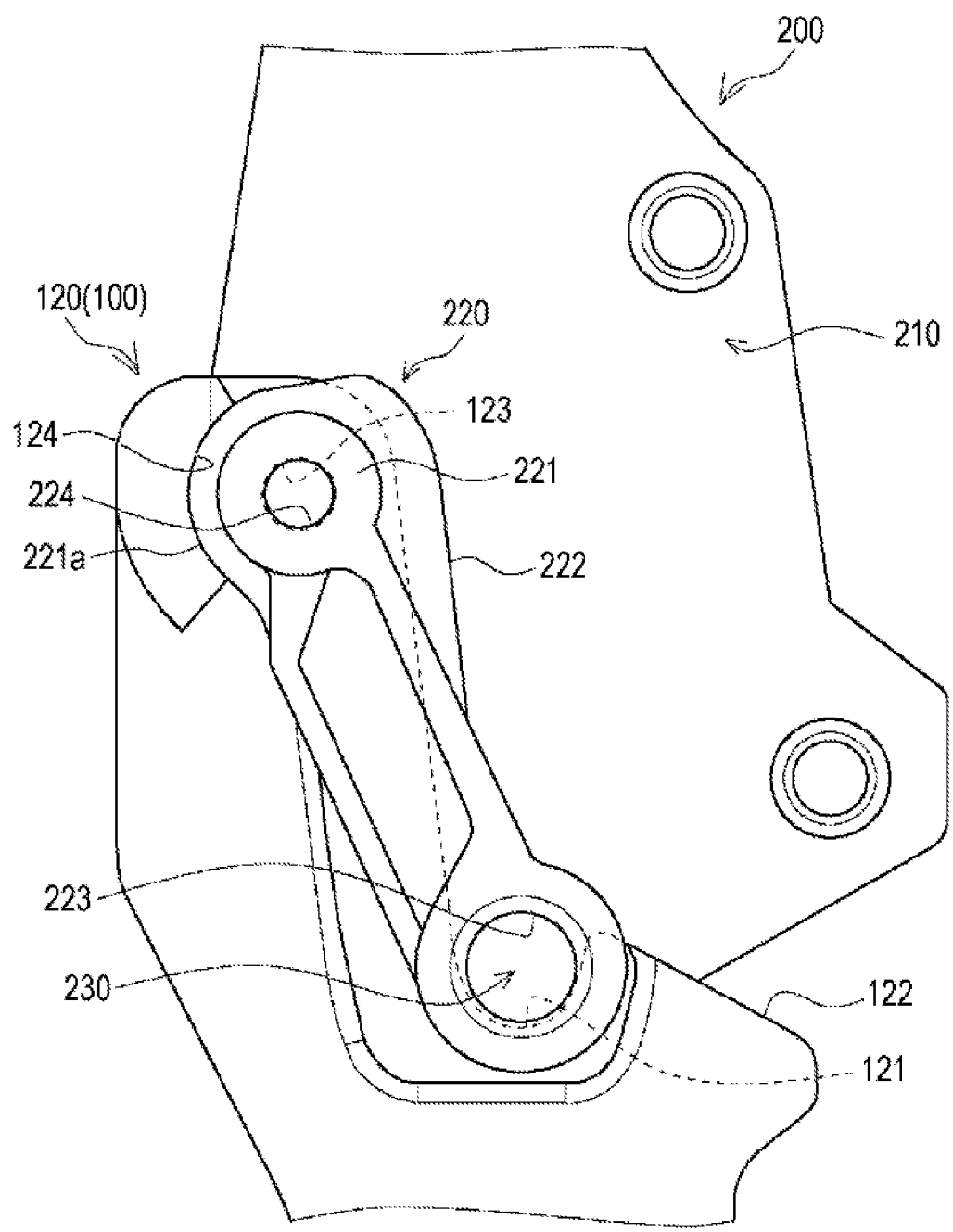

Next, a detailed configuration of the mainframes 100 is described using FIG. 2 to FIG. 7 and FIG. 10. In the following description, a standard state is one wherein the subframes 200 are installed to the mainframes 100. Note that in the following, a position of the subframes 200 in the state of being installed to the mainframes 100 is referred to as an "installation position" of the subframes 200. Moreover, in FIG. 5 to FIG. 7, illustration is omitted for a right-side supporting plate 210 of the subframes 200 and a member connecting left and right supporting plates 210 together.

Note that the pair of left and right mainframes 100 is formed to have left-right symmetry with each other; in FIG. 2 to FIG. 7 and FIG. 10, among the pair of left and right mainframes 100, the right-side mainframe 100 is illustrated. Unless indicated otherwise, the following description is regarding the right-side mainframe 100, and description of the left-side mainframe 100 is omitted.

The mainframe 100 illustrated in FIG. 2 supports the subframe 200. Details are described below, but the mainframe 100 supports the subframe 200, described below, from below and is fixed to the subframe 200 by a fixing pin 500 or the like. The mainframe 100 is mainly equipped with a fixing frame 110 and a supporting frame 120.

The fixing frame 110 illustrated in FIG. 2 is a portion fixed to the car body 1. The fixing frame 110 is formed in a plate shape having plate faces facing a left-right direction. The fixing frame 110 is disposed so its longitudinal direction is oriented in the front-back direction. The fixing frame 110 is fixed to the machine body frame 2 by a bolt or the like.

The supporting frame 120 illustrated in FIG. 2 to FIG. 7 and FIG. 10 is a portion that supports the subframe 200. The supporting frame 120 has a lower portion thereof fixed to a right face (face on an outer side in a car-body left-right direction) of the fixing frame 110 by a bolt or the like and is formed so as to extend substantially upward from this lower portion. The supporting frame 120 is equipped with a hook 121, a guide face 122, a mainframe-side insertion hole 123, and a concave portion 124.

The hook 121 illustrated in FIG. 3, FIG. 4, and FIG. 7 is a portion that engages the subframe 200 described below (more specifically, a pin 230). The hook 121 is formed in a midway portion, in terms of up and down, of the supporting frame 120. In a side view, the hook 121 is formed substantially in an upward-opening U shape in a side view. A face on an inner side of the hook 121 is formed substantially in an arc shape.

The guide face 122 illustrated in FIG. 3 to FIG. 7 is for guiding the subframe 200 described below (more specifically, the pin 230) to the installation position when mounting the subframe 200 to the mainframe 100. The guide face 122 is formed forward of the hook 121. The guide face 122 has a back end thereof connected to the hook 121 and is formed as a forward and downward incline whose height in an up-down direction decreases in heading forward.

Figure 10:
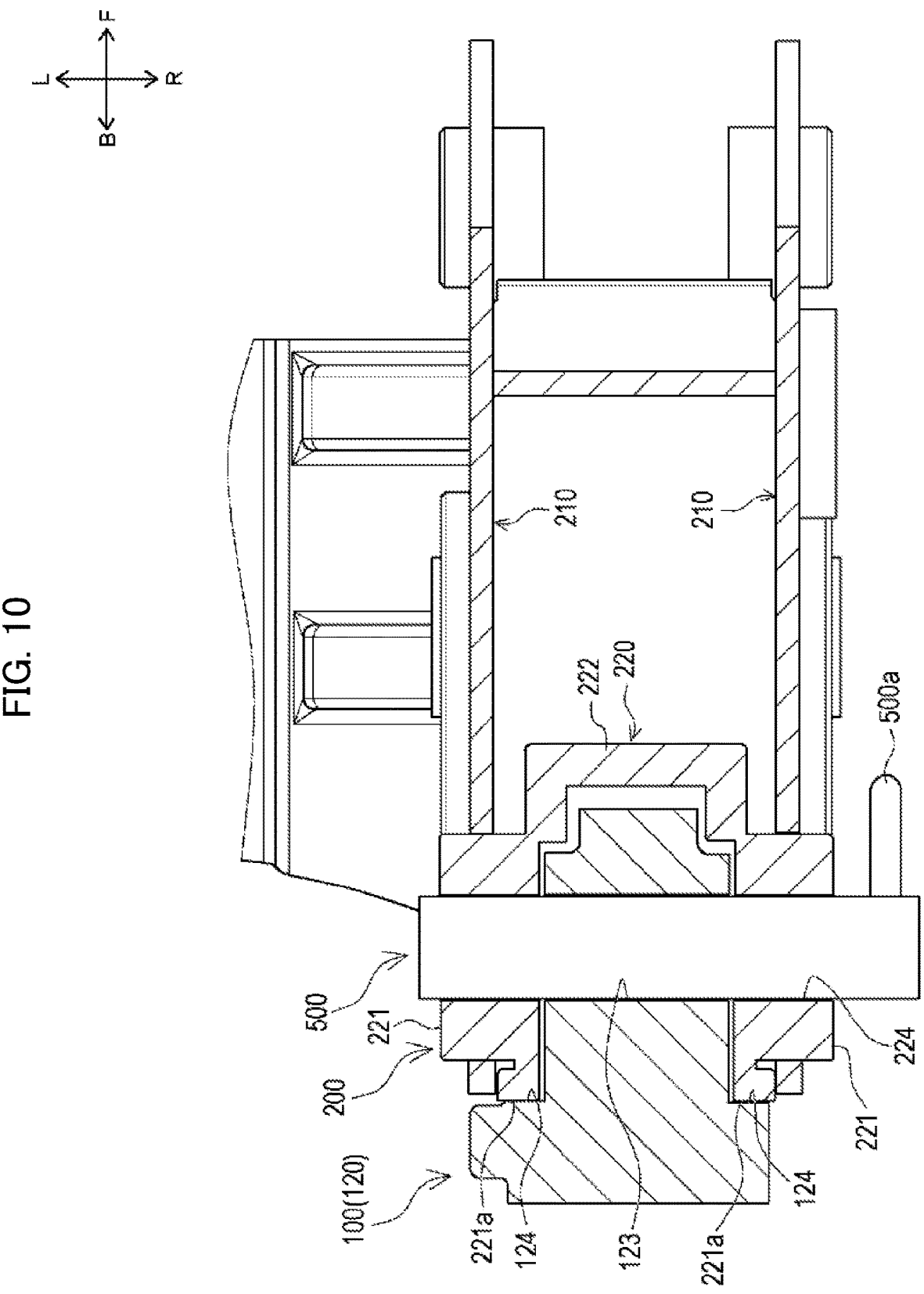
FIG. 10 is a sectional view at A-A in FIG. 3.

The mainframe-side insertion hole 123 illustrated in FIG. 4 and FIG. 10 is a portion into which the fixing pin 500 is inserted. The mainframe-side insertion hole 123 is formed so as to penetrate the supporting frame 120 from left to right. The mainframe-side insertion hole 123 is formed upward of the hook 121. Moreover, the mainframe-side insertion hole 123 is formed backward of the hook 121.

The concave portion 124 illustrated in FIG. 3, FIG. 4, FIG. 7, and FIG. 10 is for guiding the subframe 200 described below (more specifically, an upper-portion insertion hole 224) to the installation position when mounting the subframe 200 to the mainframe 100. The concave portion 124 is formed backward of the mainframe-side insertion hole 123. The concave portion 124 is formed in a portion protruding to an outer side, in the car-body left-right direction, of a face wherein the mainframe-side insertion hole 123 is formed. The concave portion 124 is formed so as to be recessed backward in an arc shape in a side view. The concave portion 124 is formed in an arc shape that is concentric with the mainframe-side insertion hole 123.

Next, a detailed configuration of the subframe 200 is described using FIG. 3 to FIG. 10. Note that the pair of left and right subframes 200 is formed to have left-right symmetry with each other; in FIG. 3 to FIG. 10, among the pair of left and right subframes 200, the right-side subframe 200 is illustrated. Unless indicated otherwise, the following description is regarding the right-side subframe 200, and description of the left-side subframe 200 is omitted.

The subframe 200 illustrated in FIG. 3 to FIG. 8 and FIG. 10 is a portion disposed between the mainframe 100 and the boom 300. An upper portion of the subframe 200 rotatably supports the boom 300 (see FIG. 2). The subframe 200 is equipped with the supporting plate 210, an attachment member 220, and the pin 230.

The supporting plate 210 illustrated in FIG. 3 to FIG. 8 and FIG. 10 is a portion constituting a right portion and a left portion of the subframe 200. The supporting plate 210 is formed in a plate shape having plate faces facing the left-right direction. The supporting plate 210 is disposed having its longitudinal direction oriented in the up-down direction. A pair of left and right supporting plates 210 is disposed, these being connected to each other by an appropriate member. A through hole 211 is formed in the supporting plate 210.

Figure 8:
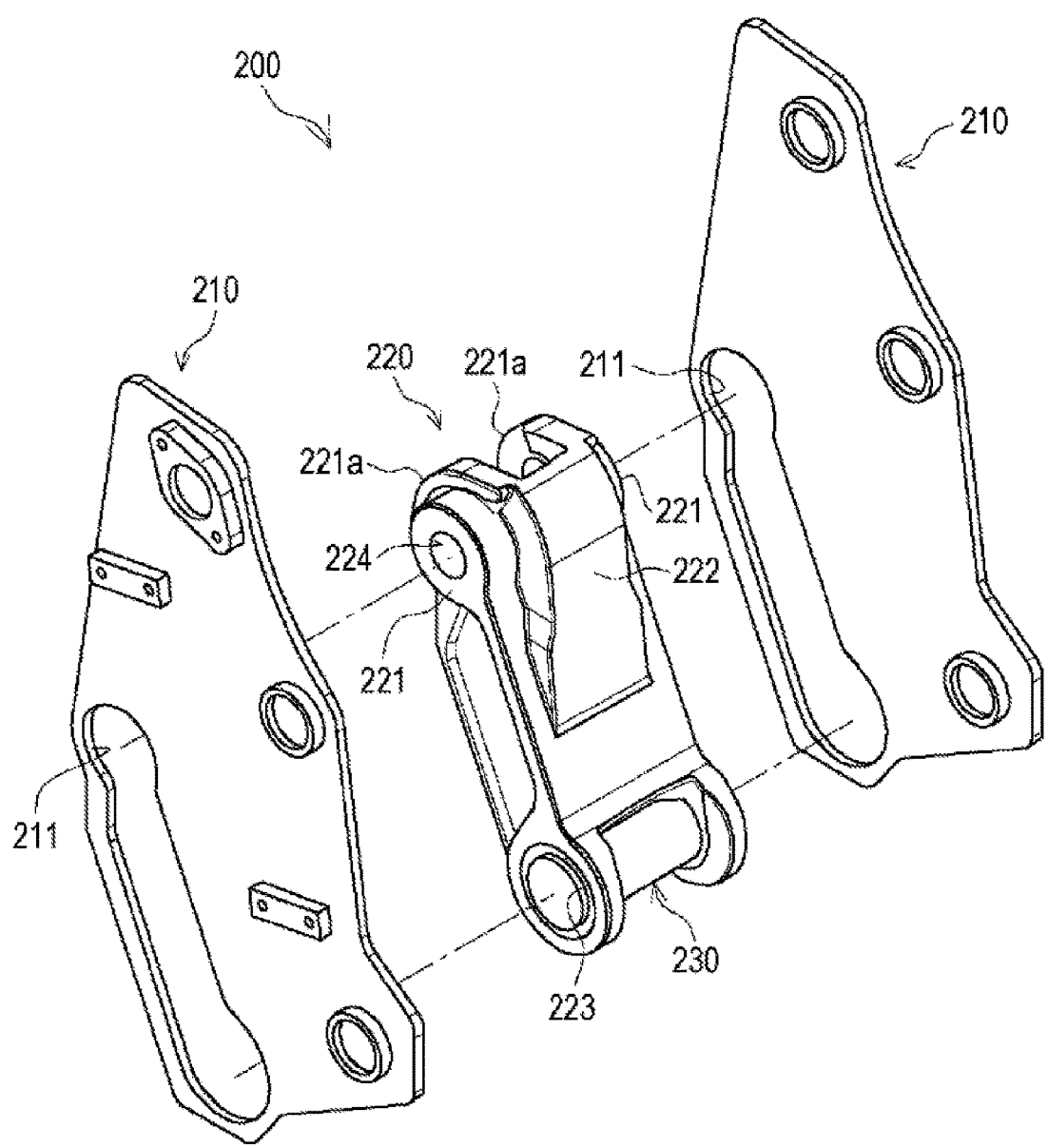
FIG. 8 is an exploded front perspective view illustrating the subframe.
Figure 9:
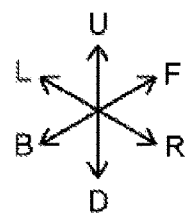
FIG. 9 is an exploded back perspective view illustrating an attachment member.
Figure 9:
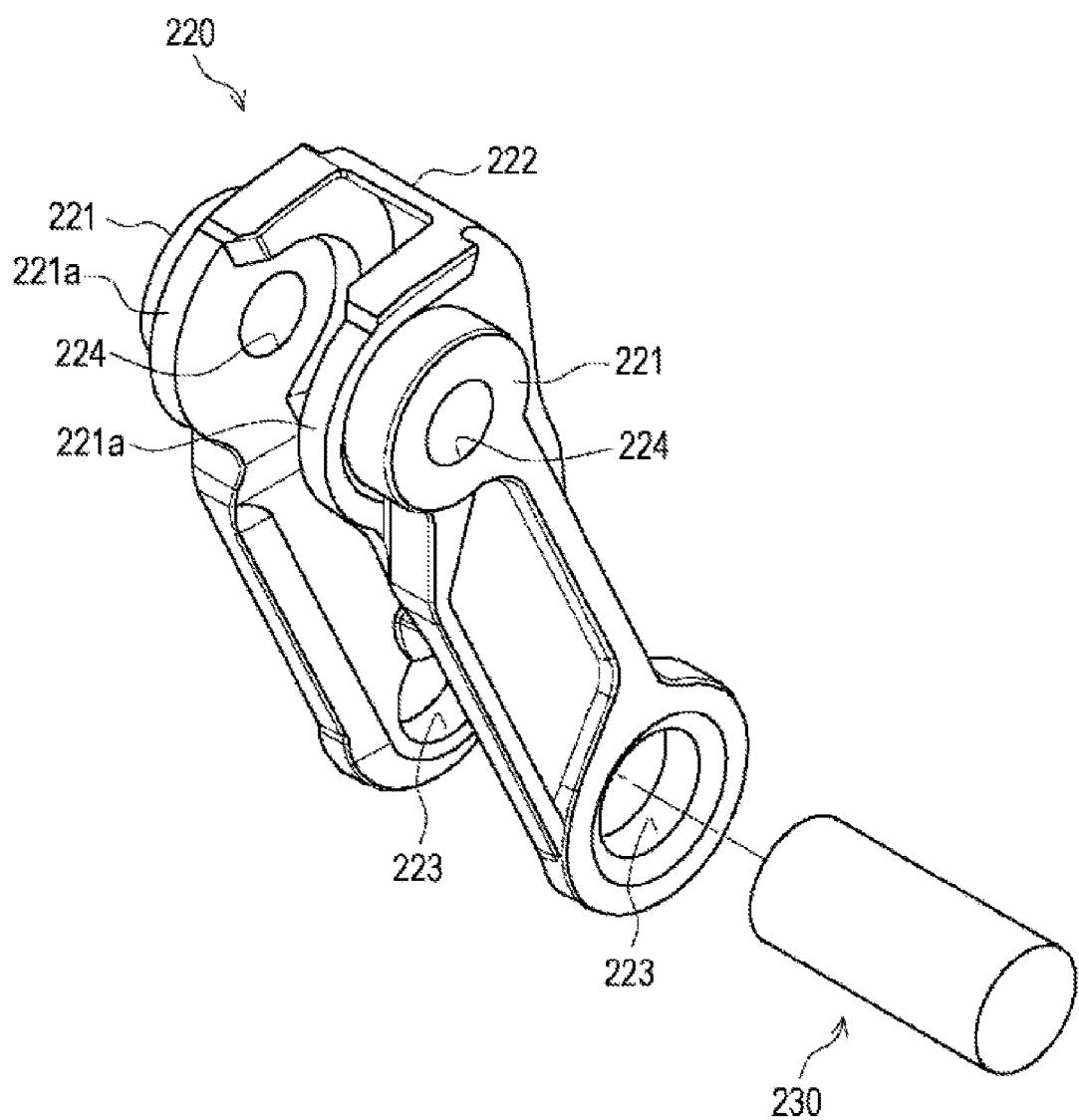

The through hole 211 illustrated in FIG. 8 is formed so as to penetrate the supporting plate 210 in the left-right direction. The through hole 211 is formed in each of the pair of left and right supporting plates 210. The through hole 211 is formed in a shape wherein the attachment member 220, which is described below, can fit.

The attachment member 220 illustrated in FIG. 3 to FIG. 10 is for installing the subframe 200 to the mainframe 100. The attachment member 220 is integrally molded by casting or forging. The attachment member 220 is formed substantially in a U shape in a plan view, an open side facing substantially backward. The attachment member 220 is disposed having its longitudinal direction oriented substantially in the up-down direction. More specifically, the attachment member 220 is disposed in a tilted state wherein an upper end is positioned backward of a lower end. The attachment member 220 is equipped with a lateral-face portion 221, a coupling portion 222, a lower-portion insertion hole 223, and the upper-portion insertion hole 224.

The lateral-face portion 221 illustrated in FIG. 5 to FIG. 10 is a portion constituting a right portion and a left portion of the attachment member 220. A pair of left and right lateral-face portions 221 is disposed. The pair of left and right lateral-face portions 221 is formed so as to house an upper portion of the supporting frame 120 of the mainframe 100 therebetween. A convex portion 221a is formed on the lateral-face portion 221.

The convex portion 221a illustrated in FIG. 6 to FIG. 10 is a portion protruding backward from the lateral-face portion 221. The convex portion 221a constitutes a back face of an upper portion of the lateral-face portion 221 and is formed in an arc shape that is concentric with the upper-portion insertion hole 224 in a side view. An outer diameter of the convex portion 221a is formed to roughly the same size as an inner diameter of the concave portion 124 of the mainframe 100. The convex portion 221a is formed so as to be fitted in the concave portion 124.

The coupling portion 222 illustrated in FIG. 5 to FIG. 10 is a portion that couples the pair of left and right lateral-face portions 221 together. The coupling portion 222 is disposed between the pair of left and right lateral-face portions 221 and is formed so as to couple front ends of these lateral-face portions 221 together.

The lower-portion insertion hole 223 illustrated in FIG. 4 to FIG. 9 is a portion into which the pin 230, described below, is inserted. The lower-portion insertion hole 223 is formed so as to penetrate a lower portion of the attachment member 220 (lateral-face portion 221) from left to right. The lower-portion insertion hole 223 is formed in a position corresponding to the hook 121 (roughly the same position as the hook 121 in a side view).

The upper-portion insertion hole 224 illustrated in FIG. 5 to FIG. 10 is a portion into which the fixing pin 500 is inserted. The upper-portion insertion hole 224 is formed so as to penetrate an upper portion of the attachment member 220 (lateral-face portion 221) from left to right. The upper-portion insertion hole 224 is formed in a position corresponding to the mainframe-side insertion hole 123 (roughly the same position as the mainframe-side insertion hole 123 in a side view). The upper-portion insertion hole 224 is formed upward and backward of the lower-portion insertion hole 223.

The attachment member 220 formed in this manner is fixed by welding or the like to the supporting plate 210 in a state wherein the lateral-face portion 221 is fitted in the through hole 211 (see FIG. 8). This provides the attachment member 220 so a portion of the lateral-face portion 221 is exposed on an outer side of the pair of left and right supporting plates 210 (rightward and leftward of the supporting plates 210).

The pin 230 illustrated in FIG. 3 to FIG. 9 is a portion that engages the hook 121 of the mainframe 100. The pin 230 is formed in a cylindrical shape and is disposed having its axis oriented in the left-right direction. The pin 230 is fixed to the attachment member 220 in a state of being inserted into the lower-portion insertion hole 223. An outer diameter of the pin 230 is formed to roughly the same size as an inner diameter of the hook 121. The pin 230 is formed so as to be fitted in the hook 121.

In the mainframe 100 and the subframe 200 formed in this manner, the fixing pin 500 is inserted into the upper-portion insertion hole 224 and the mainframe-side insertion hole 123 in a state wherein the pin 230 engages the hook 121. A retainer 500a is inserted into the fixing pin 500 on an outer side of the subframe 200 (see FIG. 4 and the like). The retainer 500a can prevent this fixing pin 500 from falling out of the upper-portion insertion hole 224 and the mainframe-side insertion hole 123 by appropriately engaging the subframe 200.

In this manner, the subframe 200 is fixed to the mainframe 100, and by extension, the front loader 20 is mounted to the car body 1.

Figure 11:
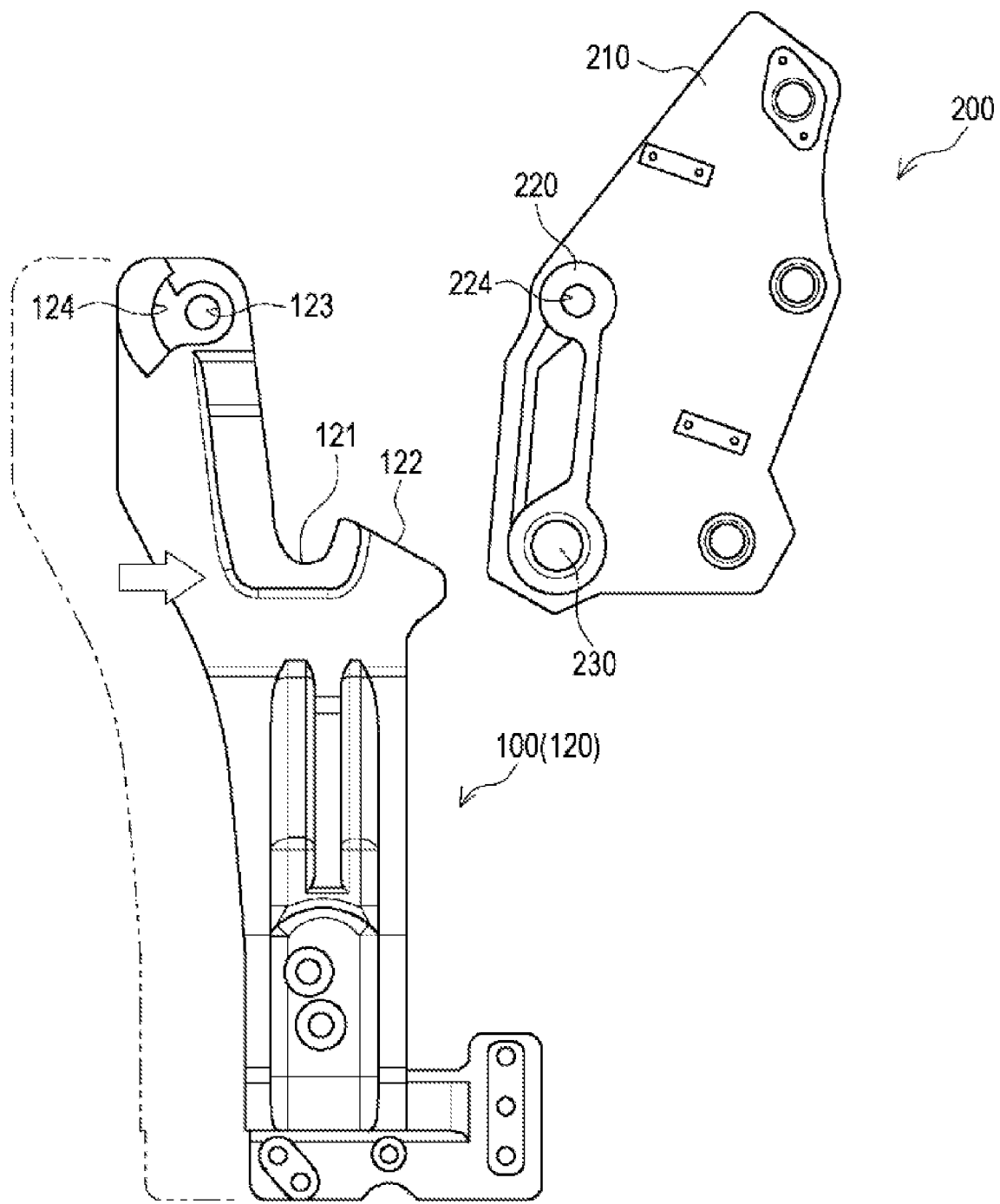
FIG. 11 is a right side view illustrating a state wherein the mainframe is brought near the subframe at a time of mounting the front loader.
Figure 12:
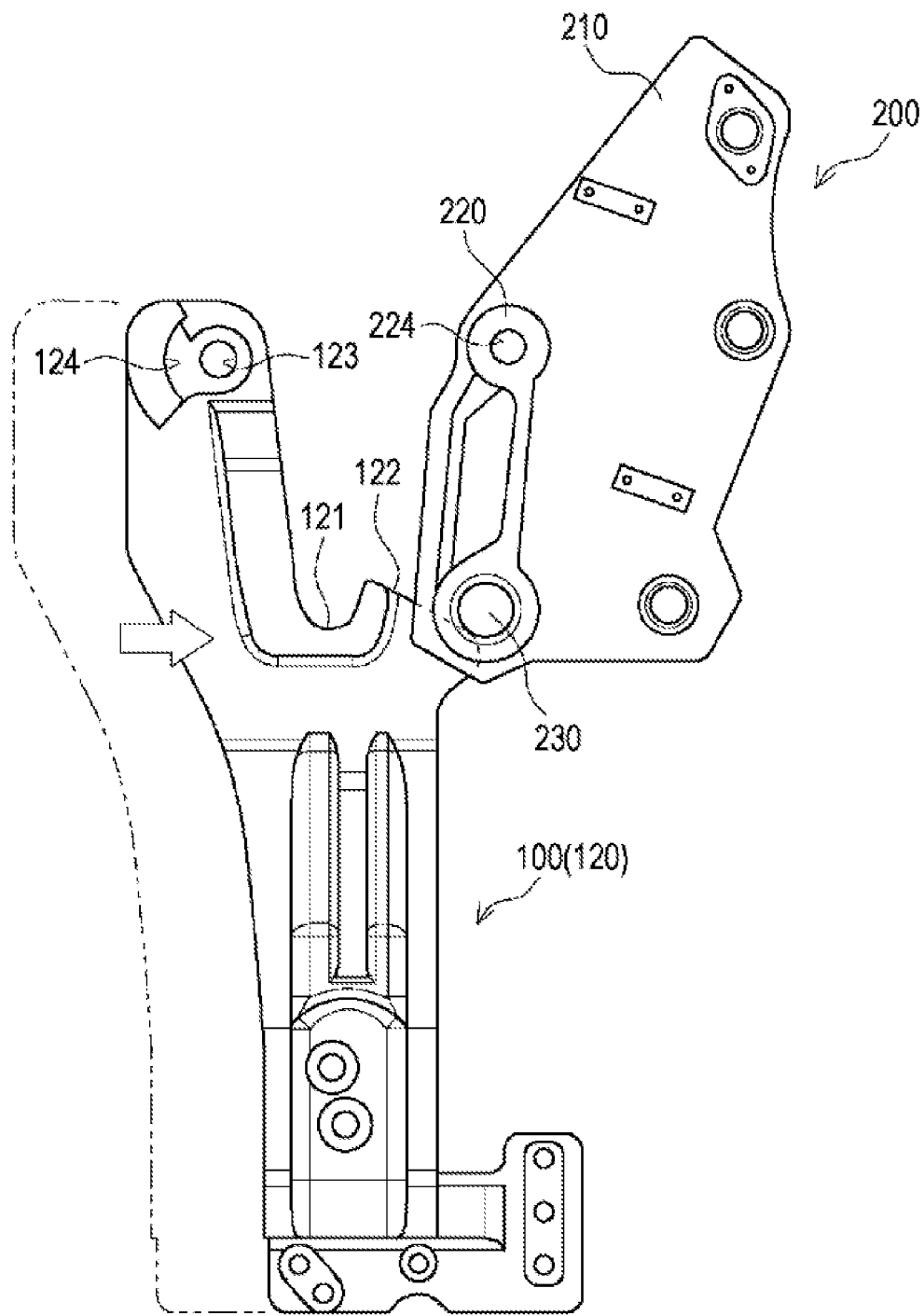
FIG. 12 is a right side view illustrating a state wherein a guide face of the mainframe contacts a pin of the subframe at the time of mounting the front loader.
Figure 13:
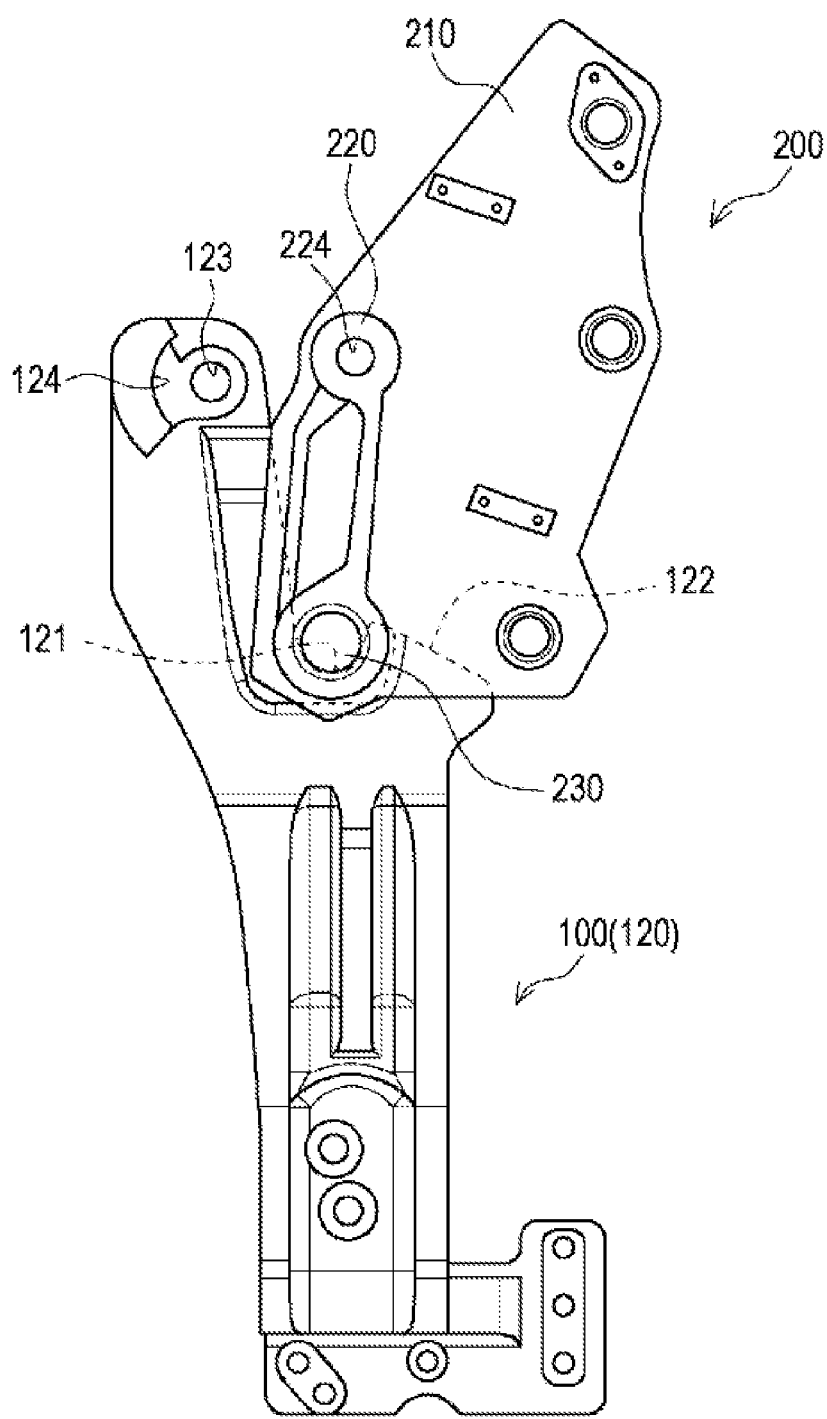
FIG. 13 is a right side view illustrating a state wherein the pin of the subframe is fitted in a hook of the mainframe at the time of mounting the front loader.

Next, a method of mounting the front loader 20 (more specifically, a portion of the front loader 20 excluding the mainframe 100) to the car body 1 is described using FIG. 11 to FIG. 14. Note that FIG. 11 to FIG. 13 illustrate the right-side mainframe 100 and subframe 200 among the pairs of left and right mainframes 100 and subframes 200.

First, as illustrated in FIG. 11, an attitude of the subframe 200 is placed in a state of having an upper end tilted forward of the installation position (see FIG. 3) (forwardly tilted state). The car body 1 is advanced in this state, and the mainframe 100 is brought near the subframe 200.

Doing so contacts the pin 230 to the guide face 122, as illustrated in FIG. 12. When the car body 1 is further advanced, the subframe 200 moves along the guide face 122, thereby moving upward and backward relative to the mainframe 100.

When the car body 1 is further advanced, the subframe 200 undergoes further relative movement upward and backward along the guide face 122, and as illustrated in FIG. 13, the pin 230 fits into (engages) the hook 121.

Figure 14:
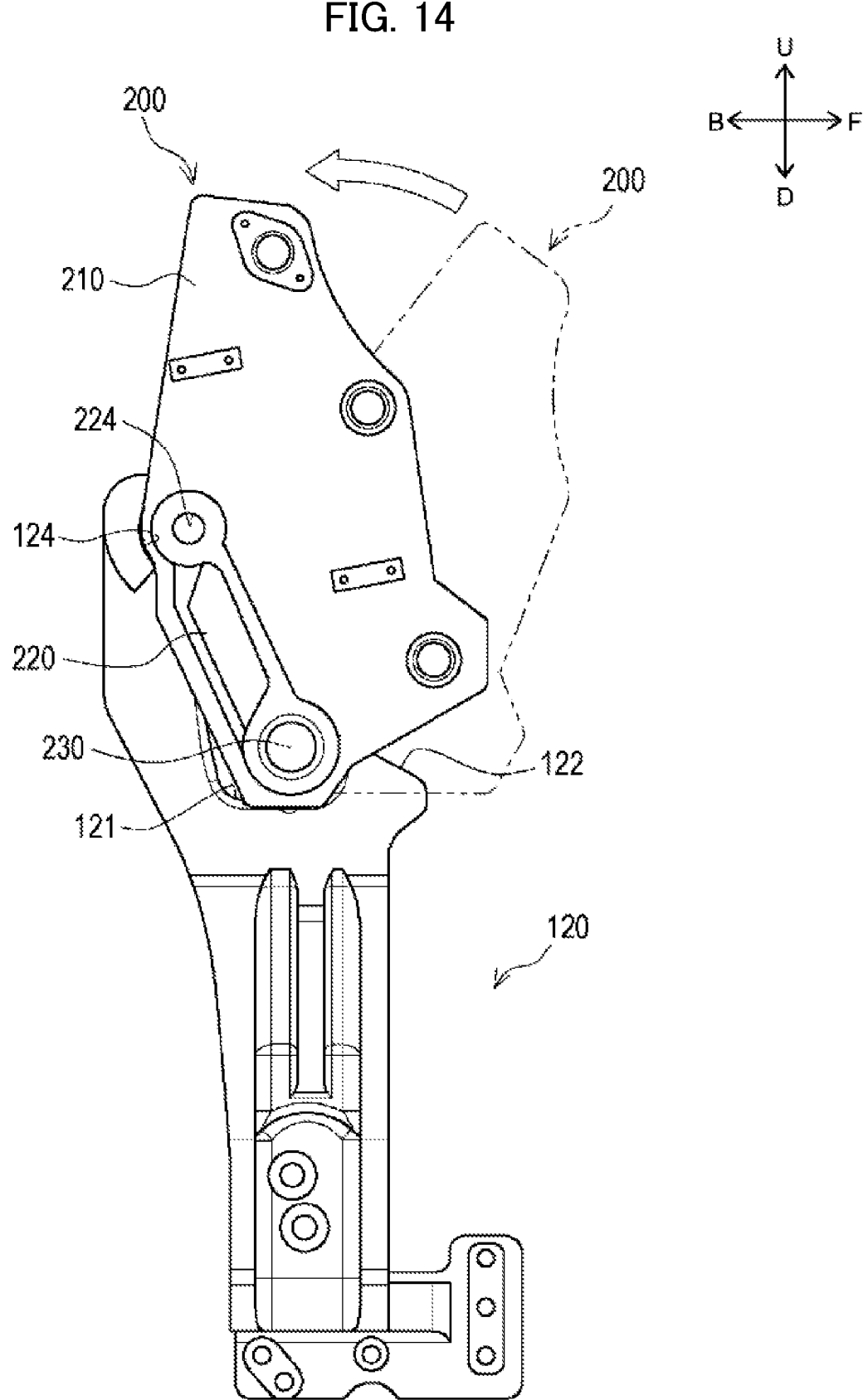
FIG. 14 is a right side view illustrating the subframe and the mainframe in a state wherein a fixing pin can be inserted at the time of mounting the front loader.

Then, by a hydraulic apparatus or the like, an upper portion of the subframe 200 is pressed backward. As illustrated in FIG. 14, this rotates the subframe 200 counterclockwise, in a right side view, around the axis of the pin 230. At a point when the subframe 200 has rotated by a predetermined angle, the convex portion 221a of the attachment member 220 contacts the concave portion 124 of the supporting frame 120 (see FIG. 7). Then, an outer peripheral face of the convex portion 221a slides against an inner peripheral face of the concave portion 124 such that the upper-portion insertion hole 224 is guided to roughly the same position as the mainframe-side insertion hole 123 in a side view. This enables the fixing pin 500 to be inserted into the upper-portion insertion hole 224 and the mainframe-side insertion hole 123, and by extension, the subframe 200 can be fixed to the mainframe 100.

As above, in the present embodiment, both the lower-portion insertion hole 223 into which the pin 230 is inserted (wherein the pin 230 is fixed) and the upper-portion insertion hole 224 into which the fixing pin 500 is inserted are formed in the attachment member 220 that is integrally molded by casting or forging. Because the lower-portion insertion hole 223 and the upper-portion insertion hole 224 are formed in the attachment member 220 that is integrally formed in this manner, a distance (pitch) between the lower-portion insertion hole 223 and the upper-portion insertion hole 224 and a parallelism between the lower-portion insertion hole 223 and the upper-portion insertion hole 224 can be improved. In particular, because the lower-portion insertion hole 223 and the upper-portion insertion hole 224 can be formed at once without re-clamping the attachment member 220 (by clamping the attachment member 220 once), this attachment member 220 being an integrated member (or being integrally formed or molded), a dimensional precision of the distance, the parallelism, and the like can be further improved.

Because a dimensional precision of the lower-portion insertion hole 223 and the upper-portion insertion hole 224 can be improved in this manner, the positions of the upper-portion insertion hole 224 and the mainframe-side insertion hole 123 can be precisely matched in the state wherein the pin 230 engages the hook 121, without making an inner diameter of the upper-portion insertion hole 224 or the mainframe-side insertion hole 123 excessively large. As such, the fixing pin 500 can be inserted into the upper-portion insertion hole 224 and the mainframe-side insertion hole 123 without securing an excessively large inner diameter of the upper-portion insertion hole 224 (clearance with the fixing pin 500), and easy detachability of the subframe 200 from the mainframe 100 can be maintained.

Furthermore, because a difference between the inner diameter of the upper-portion insertion hole 224 or the mainframe-side insertion hole 123 and an outer diameter of the fixing pin 500 can be made comparatively small, rattling in a portion fixing the mainframe and the subframe (between the fixing pin 500 and the upper-portion insertion hole 224 and mainframe-side insertion hole 123) can be suppressed. Moreover, rattling being suppressed can improve a durability of the front loader 20.

Another example of the method of mounting the front loader 20 to the car body 1 is described below using FIG. 15, FIG. 16, and the like. Note that in this other example, the pin 230 of the front loader 20 (subframe 200) in a detached state is disposed in a position higher than the hook 121.

Figure 15:
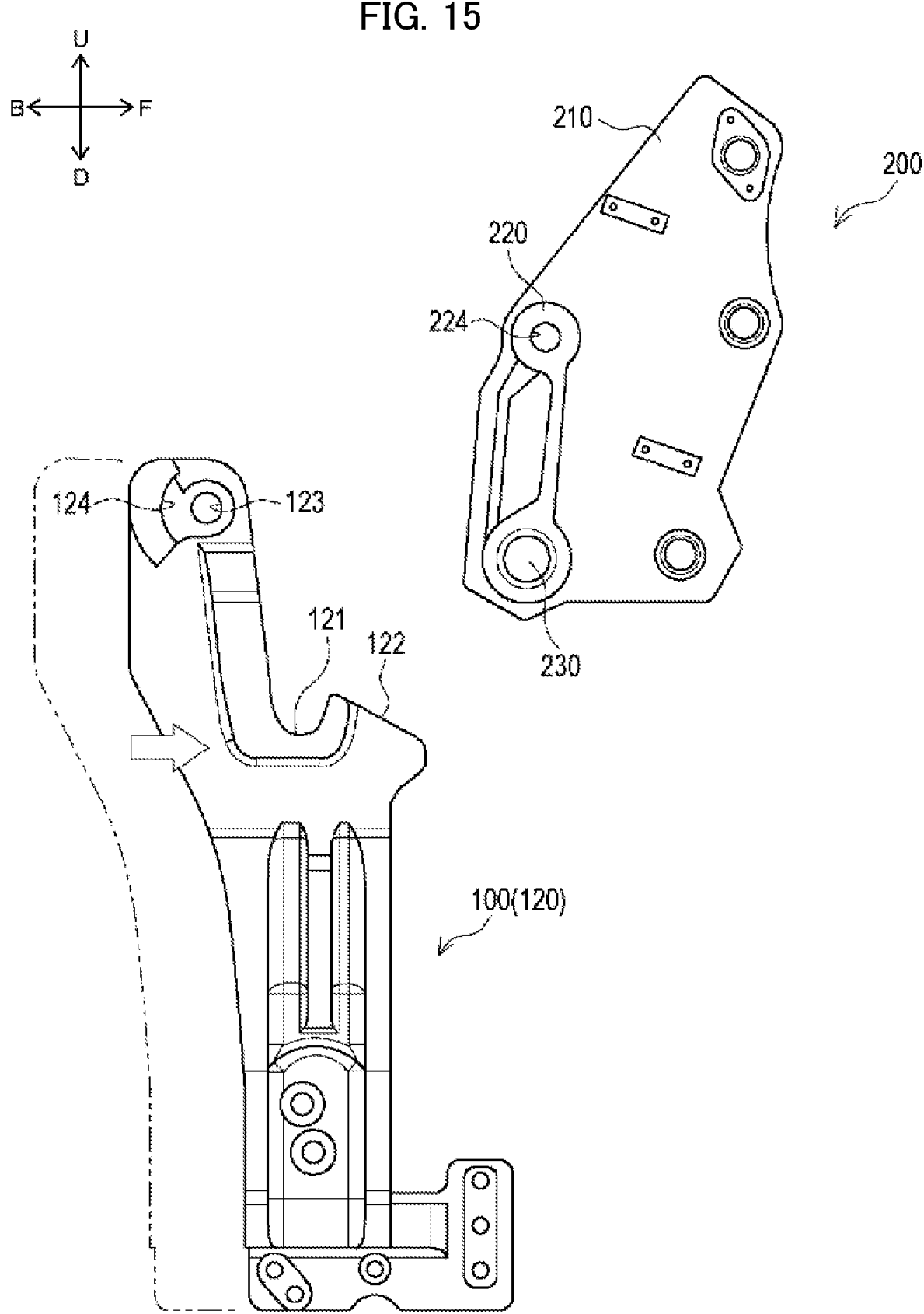
FIG. 15 is a right side view illustrating a state wherein the mainframe is brought near the subframe in another example.

In the other example, as illustrated in FIG. 15, first, the car body 1 is advanced, bringing the mainframe 100 near the subframe 200.

Figure 16:
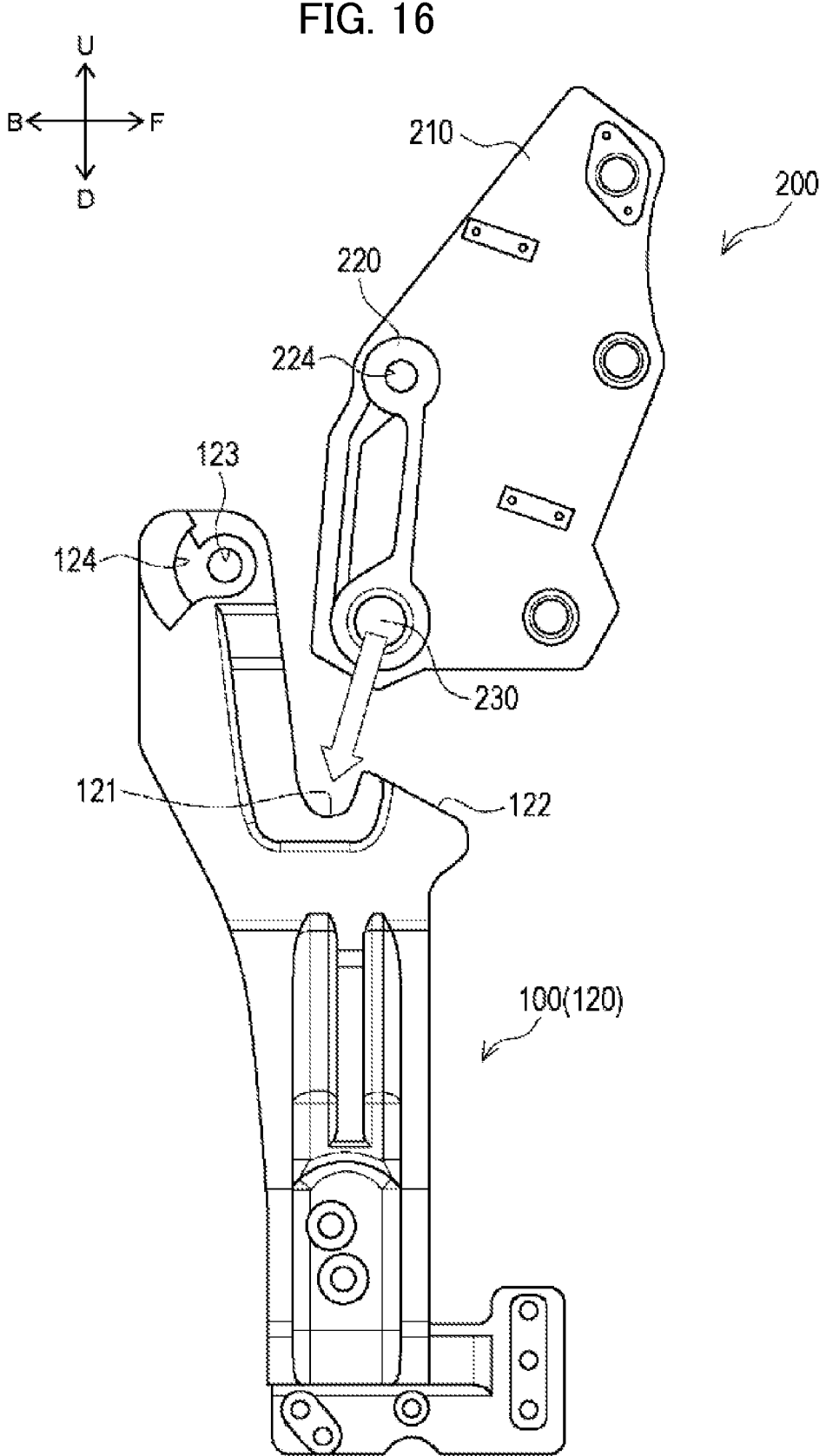
FIG. 16 is a right side view illustrating a state immediately before the pin of the subframe is fitted in the hook of the mainframe in the other example.

Doing so moves the mainframe 100 relative to the subframe 200 to a location where the pin 230 is positioned substantially upward of the hook 121 of the mainframe 100 as illustrated in FIG. 16. By actuating the hydraulic apparatus in this state, the subframe 200 is moved substantially downward. Specifically, by using the hydraulic apparatus to dump the bucket 400 of the front loader 20 and press the bucket 400 against the ground, an attitude of the front loader 20 is changed, pushing down a back portion of the front loader 20 (subframe 200) substantially downward. This enables the pin 230 to engage the hook 121 (see FIG. 13). Subsequent operations of the subframe 200 are similar to the operations described above. These can guide the subframe 200 to the installation position (see FIG. 14).

As above, the front loader 20 according to the present embodiment is equipped with: the boom 300; the mainframe 100 installed to a car body 1; and the subframe 200 that is detachable from the mainframe 100 and supports the boom 300; wherein the subframe 200 is equipped with the lower-portion insertion hole 223 (first engaging portion) formed to be able to engage (the hook 121 of) the mainframe 100 (via the pin 230) and the upper-portion insertion hole 224 (second engaging portion) formed to be able to engage (the mainframe-side insertion hole 123 of) the mainframe 100 in a position that differs from the lower-portion insertion hole 223 (via the fixing pin 500), and both the lower-portion insertion hole 223 and the upper-portion insertion hole 224 are formed in the attachment member 220 (integrated member) formed integrally so as to constitute at least a portion of the subframe 200.

By such a configuration, rattling arising in the engaging portions between the mainframe 100 and the subframe 200 can be reduced while maintaining easy detachability from the car body 1.

Specifically, forming both the lower-portion insertion hole 223 and the upper-portion insertion hole 224 in the integrally formed attachment member 220 can improve a precision of relative position dimensions between the lower-portion insertion hole 223 and the upper-portion insertion hole 224 (the distance (pitch) between these, a parallelism of the upper-portion insertion hole 224 with regard to the lower-portion insertion hole 223, and the like). This enables each engaging portion to appropriately engage the mainframe 100 without securing an excessive clearance of the lower-portion insertion hole 223 and the upper-portion insertion hole 224. As such, rattling in the engaging portions can be suppressed, and by extension, durability can be improved.

Furthermore, the second engaging portion is the upper-portion insertion hole 224 into which the fixing pin 500 for fixing the mainframe 100 and the subframe 200 is inserted.

By such a configuration, the mainframe 100 and the subframe 200 can be fixed by inserting the fixing pin 500. This enables easy mounting of the front loader 20 to the car body 1.

Furthermore, the front loader 20 is equipped with: a guide portion (concave portion 124 and convex portion 221*a*) that guides the subframe 200 to the installation position (predetermined position) where the upper-portion insertion hole 224 can engage the mainframe-side insertion hole 123 of the mainframe 100 in a state wherein the lower-portion insertion hole 223 (pin 230) engages the hook 121 of the mainframe 100 when fixing the subframe 200 and the mainframe 100.

By such a configuration, a workability when mounting the front loader 20 to the car body 1 can be further improved.

Specifically, the workability can be improved because the position of the upper-portion insertion hole 224 can be matched in a state of being supported on the mainframe 100 by (the pin 230 inserted into) the lower-portion insertion hole 223.

Furthermore, the guide portion is equipped with the convex portion 221*a* that is disposed in the subframe 200 and is formed so as to protrude in a car-body back direction (one direction) and the concave portion 124 that is disposed in the mainframe 100, is formed so as to be recessed in the car-body back direction, and can contact the convex portion 221*a*.

By such a configuration, the subframe 200 can be guided to the installation position by a simple configuration.

Furthermore, the attachment member 220 has the pair of lateral-face portions 221 disposed at an interval from each other and is formed so as to house at least a portion of the mainframe 100 between the lateral-face portions 221, and the convex portion 221*a* is formed so as to protrude in the car-body back direction from each of the lateral-face portions 221.

By such a configuration, working of the subframe 200 can be made easy.

Specifically, an ease of working the subframe 200 can be improved because there is no need to work a guide portion on an inner side of each of the lateral-face portions 221.

Furthermore, the subframe 200 is equipped with the pair of supporting plates 210 that supports the boom 300, the pair of supporting plates 210 is equipped with the through hole 211 (fitting portion) formed to be able to fit the attachment member 220, and the attachment member 220 is fixed to the pair of supporting plates 210 while being fitted to the through hole 211.

By such a configuration, the attachment member 220 can be firmly fixed to the pair of supporting plates 210 of the subframe 200.

Furthermore, the through hole 211 is formed so as to penetrate the pair of supporting plates 210.

By such a configuration, the attachment member 220 can be installed to the supporting plates by a simple configuration.

Furthermore, the attachment member 220 is molded by casting or forging.

By such a configuration, cost reduction can be achieved in molding the attachment member 220.

Furthermore, the tractor is provided with the front loader 20.

By such a configuration, rattling arising in the engaging portions between the mainframe 100 and the subframe 200 can be reduced while maintaining easy detachability from the car body 1.

Note that the attachment member 220 according to the present embodiment is a mere example of the integrated member.

Furthermore, the concave portion 124 and convex portion 221*a* according to the present embodiment are mere examples of the guide portion.

Furthermore, the lower-portion insertion hole 223 according to the present embodiment is a mere example of the first engaging portion.

Furthermore, the upper-portion insertion hole 224 according to the present embodiment is a mere example of the second engaging portion.

The present invention is not limited to the above configuration, and many variations are possible within the scope of the claimed invention.

For example, in the present embodiment, the attachment member 220 is integrally formed by being molded by casting or forging. However, it is sufficient for the attachment member 220 to not be formed by combining (fixing by welding or the like) a plurality of members and to be formed integrally from one material, and the attachment member 220 may be formed by, for example, machining.

Furthermore, in the present embodiment, the lower-portion insertion hole 223 (first engaging portion) engages (the hook 121 of) the mainframe 100 via the pin 230. Moreover, the upper-portion insertion hole 224 (second engaging portion) engages (the mainframe-side insertion hole 123 of) the mainframe 100 via the fixing pin 500. In this manner, the first engaging portion and the second engaging portion do not need to directly engage the mainframe and, as in the present embodiment, may indirectly engage such. Moreover, an aspect of engagement between the subframe 200 and the mainframe 100 is not limited thereto and can be any aspect. For example, both locations may be fixed by the fixing pin 500.

Figure 17:
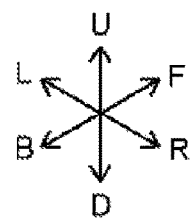
FIG. 17 is a back perspective view illustrating the subframe according to a second embodiment.
Figure 17:
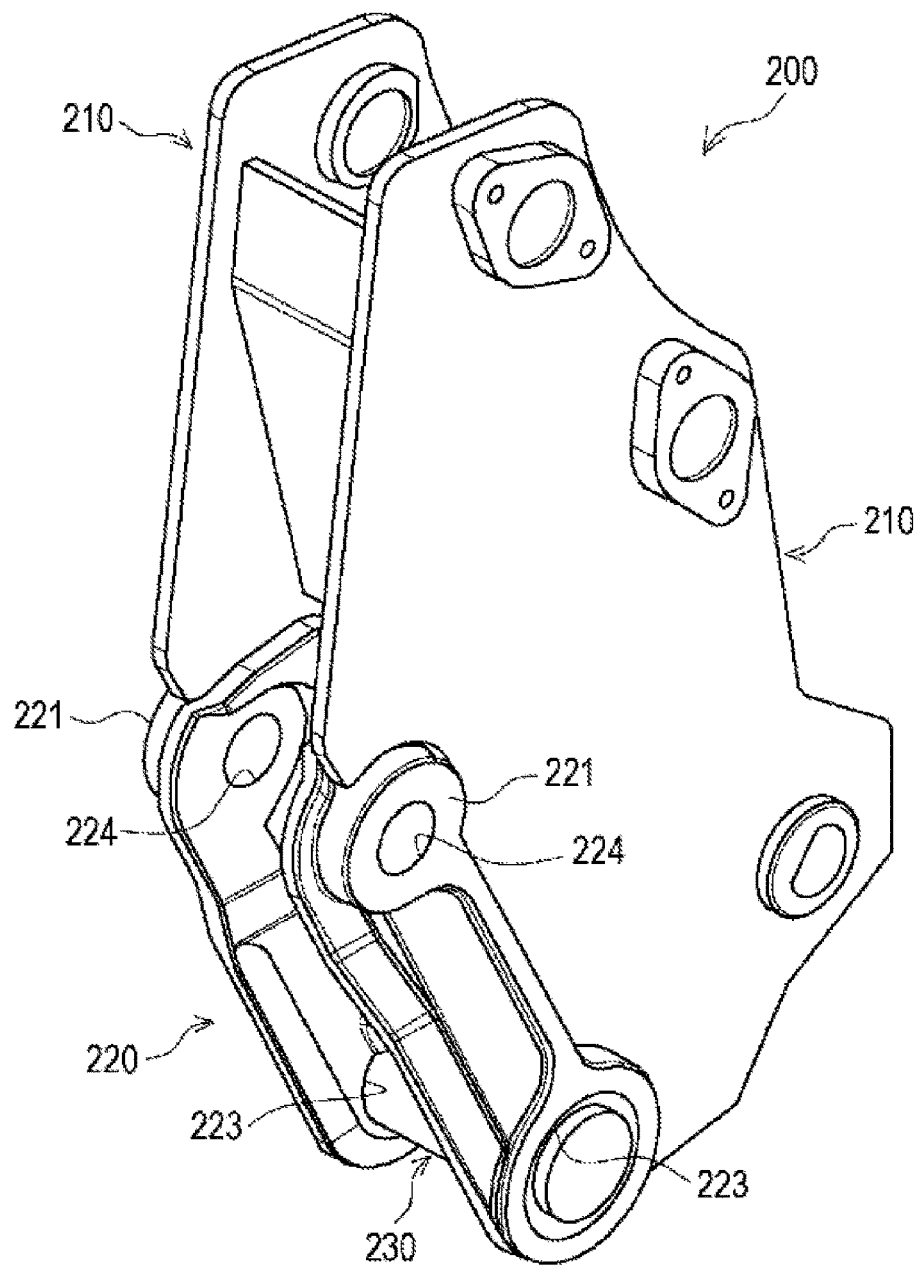

The front loader 20 according to a second embodiment of the present invention is described below with reference to FIG. 17 to FIG. 19. Note that in FIG. 19, the attachment member 220 is represented in a sectional view to clarify a position and shape of a subframe-side flat portion 225 that is described below.

The front loader 20 according to the second embodiment differs from the front loader 20 according to the first embodiment mainly in that it is equipped with a cutout portion 212 instead of the through hole 211 of the subframe 200 (supporting plate 210), it is equipped with the subframe-side flat portion 225 instead of the convex portion 221a of the subframe 200 (attachment member 220), and it is equipped with a mainframe-side flat portion 125 instead of the concave portion 124 of the mainframe 100 (supporting frame 120). Thus, in the following, configurations of the front loader 20 according to the second embodiment that are identical to the front loader 20 according to the first embodiment are labeled with the same reference signs, and description thereof is omitted.

Figure 18:
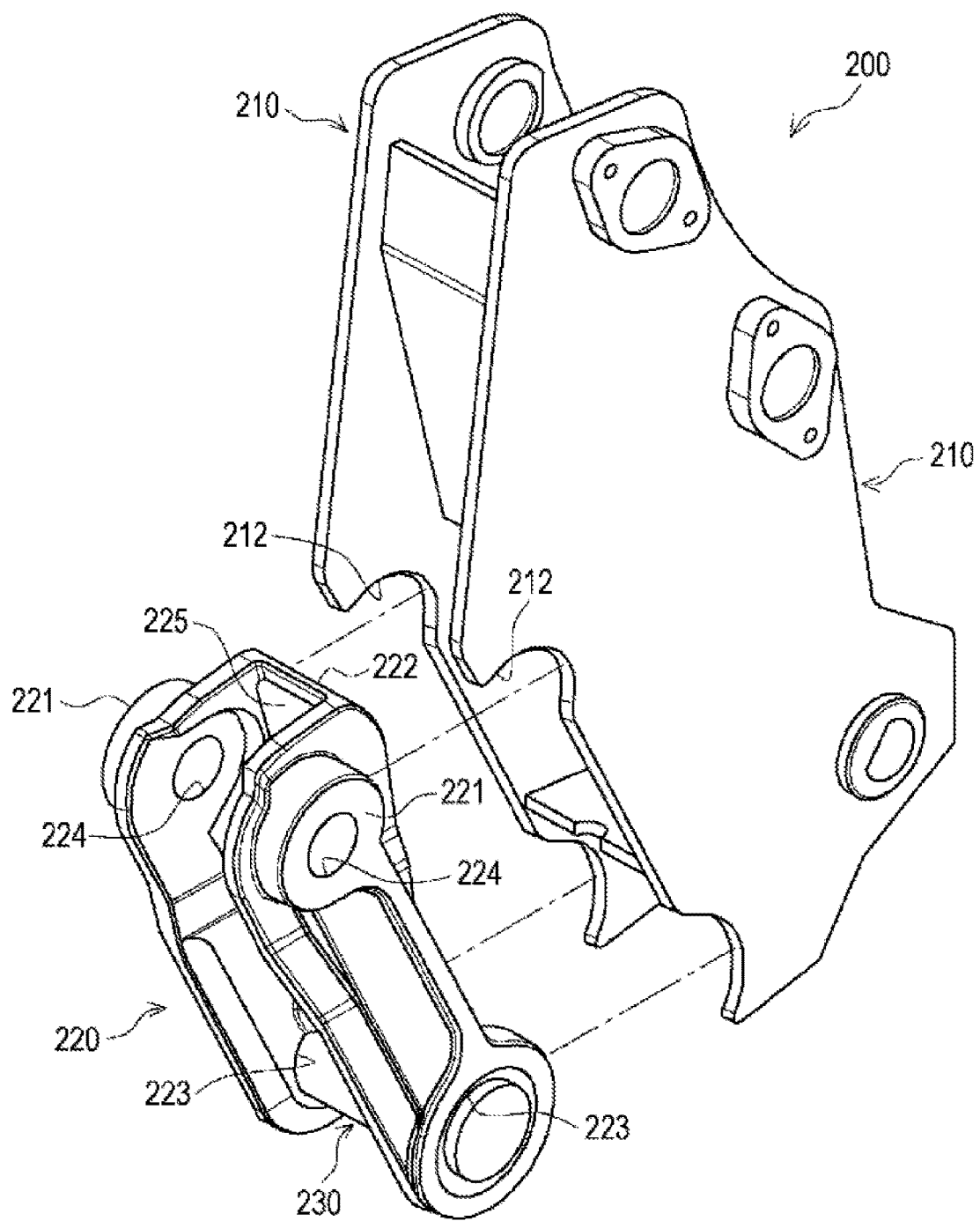
FIG. 18 is an exploded back perspective view illustrating the subframe according to the second embodiment.

The cutout portion 212 illustrated in FIG. 18 is formed by cutting out a portion of a back end of the supporting plate 210. The cutout portion 212 is formed in each of the pair of left and right supporting plates 210. The cutout portion 212 is formed in a shape wherein the attachment member 220 can fit.

Figure 19:
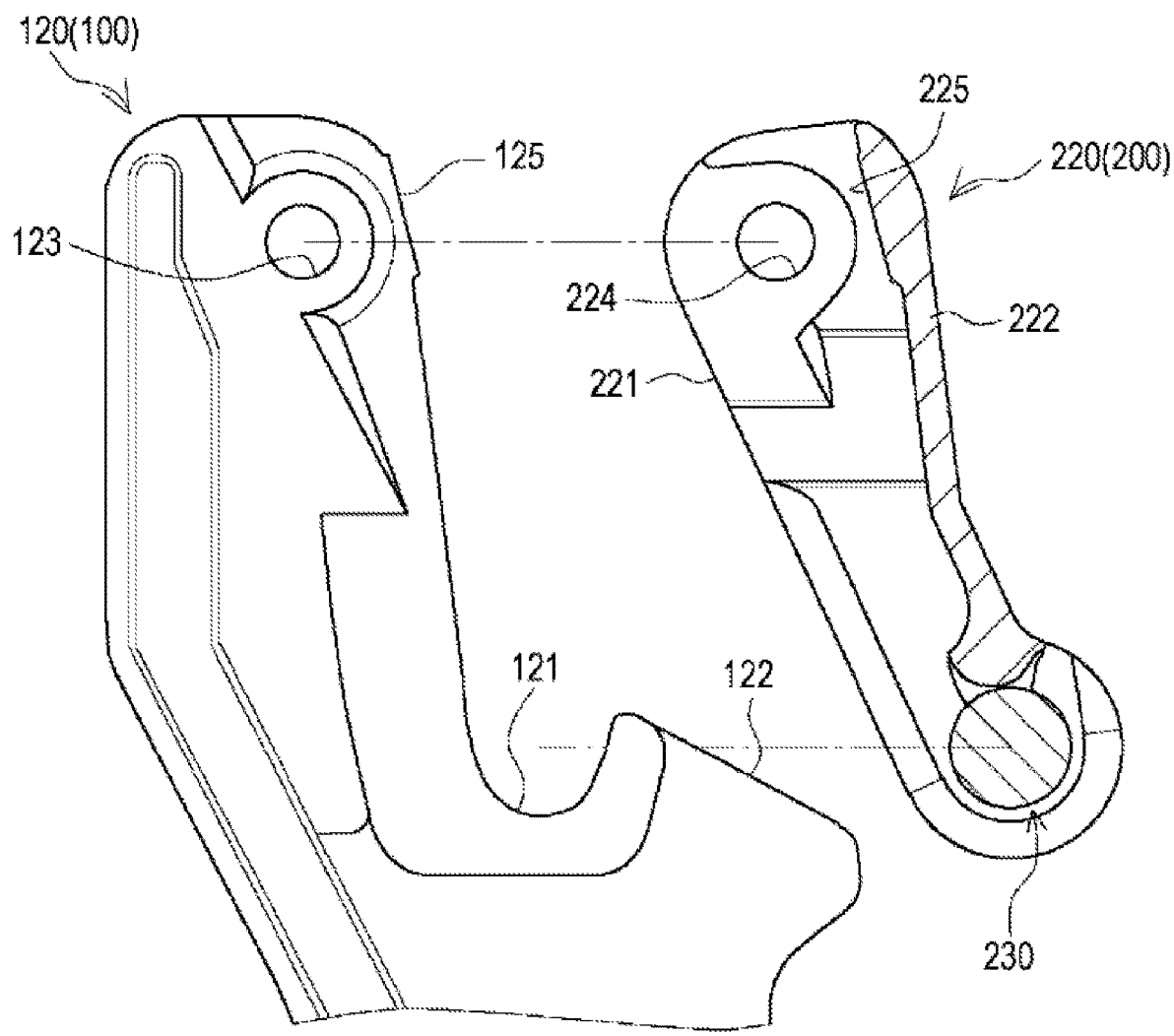
FIG. 19 is an exploded side view illustrating the mainframe and the subframe according to the second embodiment.

The subframe-side flat portion 225 illustrated in FIG. 18 and FIG. 19 is a portion formed in an upper portion of a back face of the coupling portion 222. The subframe-side flat portion 225 is formed in a flat shape having a face oriented backward and downward. The subframe-side flat portion 225 is formed substantially backward of the upper-portion insertion hole 224.

The mainframe-side flat portion 125 illustrated in FIG. 19 is a portion formed in an upper portion of a front face of the supporting frame 120. Moreover, the mainframe-side flat portion 125 is for guiding the subframe 200 (more specifically, the pin 230) to the installation position when mounting the subframe 200 to the mainframe 100. The mainframe-side flat portion 125 is formed forward of the mainframe-side insertion hole 123. The mainframe-side flat portion 125 is formed in a flat shape having a face oriented forward and upward. The mainframe-side flat portion 125 is formed substantially parallel to the subframe-side flat portion 225.

In the front loader 20 according to the second embodiment, when mounting the front loader 20 to the car body 1, the subframe 200 is rotated counterclockwise, in a right side view, around the axis of the pin 230 in the state wherein the pin 230 engages the hook 121. Doing so contacts the subframe-side flat portion 225 of the attachment member 220 to the mainframe-side flat portion 125 at a point when the subframe 200 has rotated by a predetermined angle. Then, the subframe-side flat portion 225 slides against the mainframe-side flat portion 125 such that the upper-portion insertion hole 224 is guided to roughly the same position in a side view as the mainframe-side insertion hole 123. This enables the fixing pin 500 to be inserted into the upper-portion insertion hole 224 and the mainframe-side insertion hole 123, and by extension, the subframe 200 can be fixed to the mainframe 100.

As above, in the second embodiment, the guide portion is equipped with the subframe-side flat portion 225 that is disposed in the subframe 200 and is formed in a flat shape and the mainframe-side flat portion 125 that is disposed in the mainframe 100, is formed in a flat shape, and can contact the subframe-side flat portion 225.

By such a configuration, the subframe 200 can be guided to the installation position (predetermined position) by a simple configuration.

Furthermore, the pair of supporting plates 210 is equipped with the cutout portion 212 (fitting portion) formed to be able to fit the attachment member 220, and the cutout portion 212 is formed so a portion of an end face of the pair of supporting plates 210 is cut out.

By such a configuration, the attachment member 220 can be installed to the supporting plates 210 by a simple configuration.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF REFERENCE SIGNS

1 Car body
20 Front loader
100 Mainframe
123 Mainframe-side insertion hole
124 Concave portion
125 Mainframe-side flat portion
200 Subframe
210 Supporting plate
212 Cutout portion
220 Attachment member
221 Lateral-face portion
221a Convex portion
223 Lower-portion insertion hole
224 Upper-portion insertion hole
225 Subframe-side flat portion
500 Fixing pin

What is claimed is:
1. A front loader attached to a car body, comprising:
a boom;
a mainframe that is fixed to the car body and comprises a hook and a mainframe insertion hole; and
a subframe that is detachably attached to the mainframe and supports the boom, wherein
the subframe comprises:
  a pair of supporting plates that supports the boom; and
  an attaching part that is integrally formed with the subframe, is disposed between the supporting plates, and attaches the subframe to the mainframe,
the attaching part includes:
  a first subframe insertion hole that engages with the hook of the mainframe, and
  a second subframe insertion hole that engages with the mainframe insertion hole of the mainframe at a different position from the first subframe insertion hole,
each of the supporting plates has a through hole or a cutout portion that fits the attaching part, and
the first subframe insertion hole and the second subframe insertion hole are exposed from the through hole or the cutout portion in a state where the attaching part is fitted to the through hole or the cutout portion.
2. The front loader according to claim 1, wherein
a fixing pin fixing the mainframe and the subframe is inserted into the second subframe insertion hole.
3. The front loader according to claim 1, further comprising:
a guide that:
  comprises a convex portion and a concave portion, and guides, when the subframe is attached to the mainframe, the subframe to a predetermined position at which the second subframe insertion hole engages with the mainframe insertion hole of the mainframe while the first subframe insertion hole engages with the hook of the mainframe.

4. The front loader according to claim 3, wherein
the convex portion is disposed in the subframe and protrudes in a first direction, and
the concave portion is disposed in the mainframe, is recessed in the same direction as the first direction, and contacts the convex portion.

5. The front loader according to claim 4, wherein
the attaching part has a pair of lateral-face portions disposed at an interval from each other,
at least a portion of the mainframe is housed between the lateral-face portions, and
the convex portion protrudes in the one direction from each of the lateral-face portions.

6. The front loader according to claim 3, wherein
the guide comprises:
 a subframe-side flat portion that is disposed in the subframe, and
 a mainframe-side flat portion that is disposed in the mainframe and contacts the subframe-side flat portion.

7. The front loader according to claim 1, wherein
the attaching part is fixed to the supporting plates while being fitted to the through hole or the output portion.

8. The front loader according to claim 1, wherein the attaching part is molded by casting or forging.

9. A work car comprising:
a car body; and
a front loader attached to the car body, wherein
the front loader comprises:
 a boom;
 a mainframe that is fixed to the car body and comprises a hook and a mainframe insertion hole; and
 a subframe that is detachably attached to the mainframe and supports the boom,
the subframe comprises:
 a pair of supporting plates that supports the boom; and
 an attaching part that is integrally formed with the subframe, is disposed between the supporting plates, and attaches the subframe to the mainframe,
the attaching part includes:
 a first subframe insertion hole that engages with the hook of the mainframe, and
 a second subframe insertion hole that engages with the mainframe insertion hole of the mainframe at a different position from the first subframe insertion hole,
each of the supporting plates has a through hole or a cutout portion that fits the attaching part, and
the first subframe insertion hole and the second subframe insertion hole are exposed from the through hole or the cutout portion in a state where the attaching part is fitted to the through hole or the cutout portion.

* * * * *